United States Patent [19]
Ikebe et al.

[11] Patent Number: 6,095,327
[45] Date of Patent: Aug. 1, 2000

[54] STORAGE CASE FOR CARTRIDGE, MANUFACTURING METHOD THEREOF AND CARTRIDGE

[75] Inventors: Masaru Ikebe; Yukio Miyazaki; Akio Momoi, all of Tokyo, Japan

[73] Assignee: TDK Corporation, Tokyo, Japan

[21] Appl. No.: 09/241,288

[22] Filed: Feb. 1, 1999

[30] Foreign Application Priority Data

| Feb. 2, 1998 | [JP] | Japan | 10-033570 |
| Aug. 13, 1998 | [JP] | Japan | 10-241152 |
| Aug. 13, 1998 | [JP] | Japan | 10-241153 |
| Dec. 11, 1998 | [JP] | Japan | 10-352437 |
| Jan. 20, 1999 | [JP] | Japan | 11-011775 |

[51] Int. Cl.$^7$ .................................... B65D 85/57
[52] U.S. Cl. ......................... 206/308.3; 206/232
[58] Field of Search .................... 206/232, 308.3, 206/307, 307.1, 308.1, 309, 312, 313, 459.5, 387.1, 1.5; 220/345.1

[56] References Cited

U.S. PATENT DOCUMENTS

| 3,860,248 | 1/1975 | Hunt et al. | 206/308.3 |
| 4,449,628 | 5/1984 | Egly et al. | 206/308.3 |
| 5,385,235 | 1/1995 | Ikebe et al. | 206/308.1 |
| 5,445,265 | 8/1995 | Herr et al. | 206/308.3 |
| 5,450,952 | 9/1995 | Funawatari et al. | 206/308.3 |
| 5,531,324 | 7/1996 | Kosaki et al. | 206/308.3 |
| 5,540,328 | 7/1996 | Kohtake | 206/308.1 |
| 5,782,352 | 7/1998 | Senda | 206/308.3 |
| 5,881,571 | 3/1999 | Ikebe et al. | 206/308.1 |
| 5,954,198 | 9/1999 | Ikebe et al. | 206/308.3 |
| 5,960,948 | 10/1999 | Shiga et al. | 206/232 |

FOREIGN PATENT DOCUMENTS

| 3-20313 | 5/1991 | Japan . |
| 5-278772 | 10/1993 | Japan . |
| 8-295385 | 11/1996 | Japan . |
| 9-226873 | 9/1997 | Japan . |

*Primary Examiner*—Paul T. Sewell
*Assistant Examiner*—Nhan T. Lam
*Attorney, Agent, or Firm*—Oblon, Spivak, McClelland, Maier & Neustadt, P.C.

[57] ABSTRACT

A storage case includes a main body and a cover member so supported by rotary spindles as to be rotatable with respect to the main body and rotatable between an opening position and a closing position. The cover member includes cartridge holding members, formed on right and left sides thereof, for holding and integrally rotating a cartridge inserted into between the main body and the cover member when the cover member rotates to the opening position. When the cover member is closed, an opening, which permits an insertion of a mini disk from outside, is formed between the main body and the cover member. The cover member is opened, whereby the mini disk encased in the storage case also rotates, and hence, even when an index card is disposed between, e.g., the mini disk and the main body, the index card can be taken out without pulling out the mini disk.

15 Claims, 29 Drawing Sheets

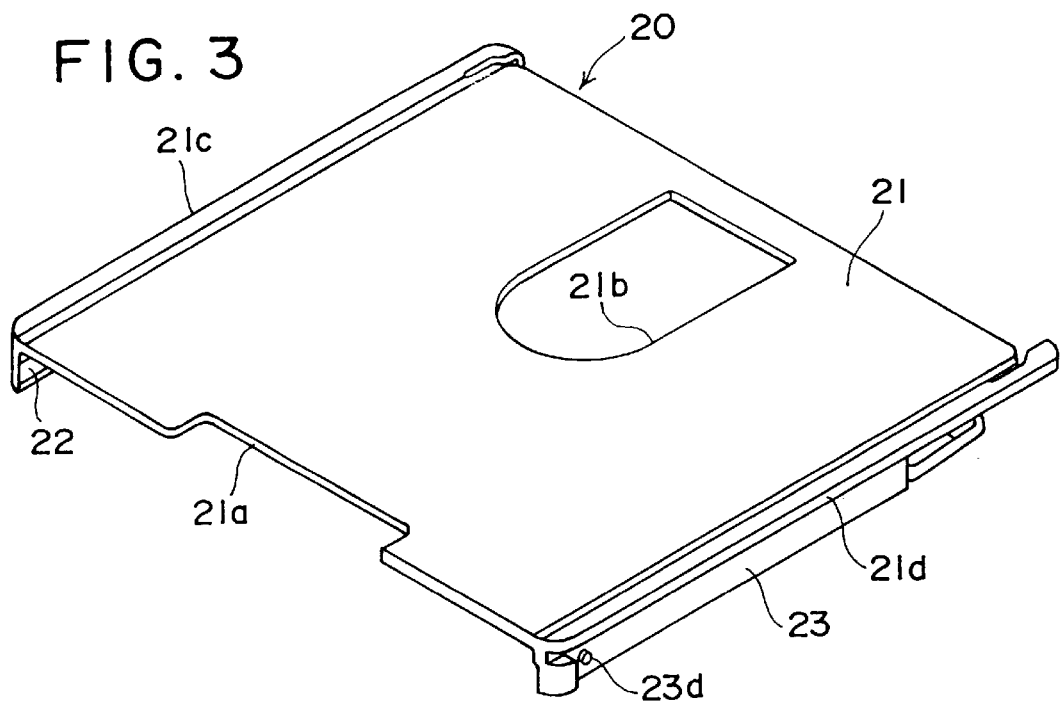
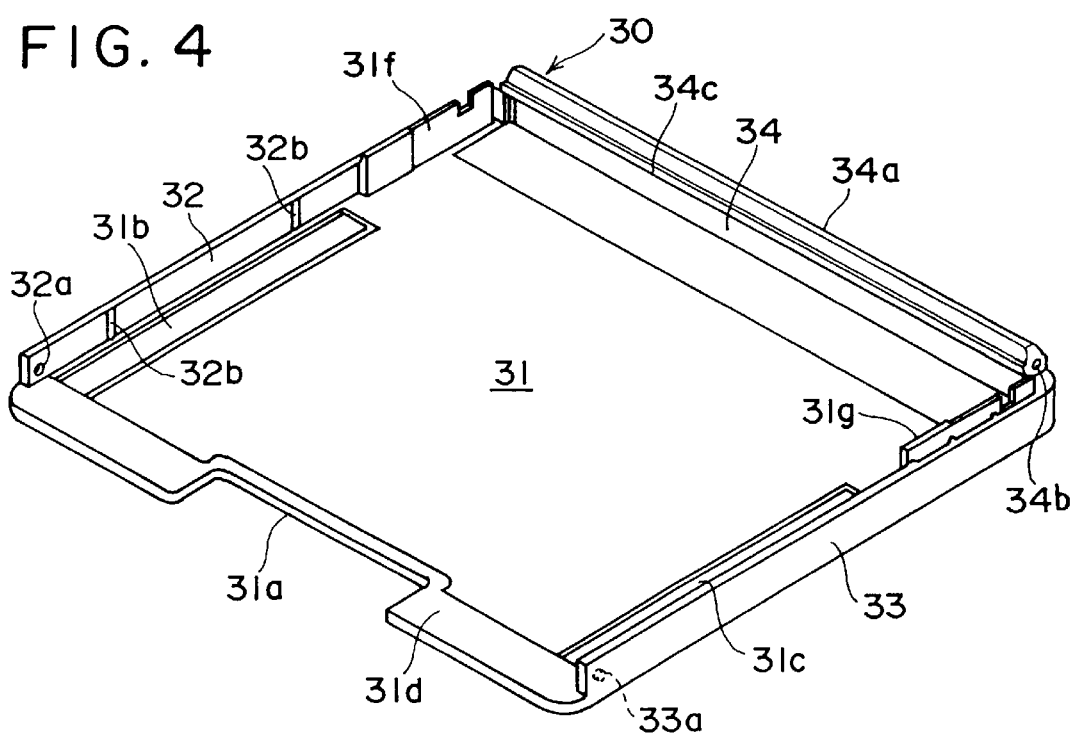

& 1

STORAGE CASE FOR CARTRIDGE, MANUFACTURING METHOD THEREOF AND CARTRIDGE

BACKGROUND OF THE INVENTION

1. Filed of the Invention

The present invention relates to a storage case for a cartridge, a method of manufacturing the storage case and a cartridge encased in this storage case, and more particularly to a storage case for a cartridge which contains a recording medium such as an optical disk and a magneto-optical disk etc.

2. Description of the Prior Art

A disk portion defined as a recording medium of a mini disk, which has been used in recent years for applications such as record of music and storage of data etc, is stored in a resinous cartridge. FIGS. 12, 13 and 34A show one example of a mini disk M. FIG. 12 is a top view of the mini disk M. FIG. 13 is a bottom view thereof, and FIG. 34A is a perspective view thereof. A disk portion D taking a shape of disk is protected by a thin box-like cartridge C. Further, there is determined an inserting direction of the mini disk M into a receiving slot (unillustrated) of a recording/reproducing apparatus. This inserting direction is upward in FIG. 12, downward in FIG. 13 and an illustrated arrow direction (obliquely downward) in FIG. 34A. Referring to FIG. 13, pawl members (not shown) of the recording/reproducing apparatus engage with cavities C1, C2 formed in the vicinities of lower edges of the cartridge C, and the mini disk M is thus carried into the apparatus. Furthermore, as shown in FIG. 34A, the cartridge c is provided with a shutter member 90, and a driving member (not shown) of the recording/reproducing apparatus engages with a slit 91a of a side surface 91 of the shutter member 90, whereby the shutter member 90 is slidable in directions t, t' in FIG. 34A. The shutter member 90 moves in the direction t' when in recording/reproducing processes, there is executed writing to or reading from the disk portion D.

Incidentally, when the music and the information are recorded on the mini disk M, it is a general practice that the mini disk M is attached with an index card on which names of recorded songs and recorded contents are written. The index card containing such entries is stored together with the mini disk M. In many cases, however, the mini disk is stored as encased in the storage case, and therefore, if the index card is pasted to the cartridge C, the entry area is rubbed against the storage case or stained when taken in and out, and there might occur a possibility in which the entries become blurred due to a long-term use. Further, when the mini disk M is inserted into the recording/reproducing apparatus, the index card is to be exfoliated from the cartridge C, and there might also a possibility in which the recording/reproducing apparatus is incapable performing its function. Such being the case, the index card is generally attached to the storage case stored with the mini disk M.

As discussed above, the storage case attached with the index card (a label) is disclosed in, e.g., Japanese Patent Application Laid-Open Nos.5-278772 and 9-226873. There arise, however, the following problems inherent in the storage cases according to the prior art.

First, the storage case disclosed in Japanese Patent Application Laid-Open No.5-278772 takes a sleeve-like shape, and it is therefore difficult that the index card is disposed in a proper position inside thereof. Accordingly, in the sleeve-like storage case, the index card is pasted to the surface of the storage case, and the names of songs and the information are written thereon. When the index card is thus pasted to the surface of the storage case, however, there might similarly occur the possibility wherein the entry area is rubbed and stained. In addition, when selling this type of mini disks, the index card and the label are not yet pasted to the storage case and the mini disk itself, then bent in a :-like shape while covering a bonding surface thereof, and thus set covering the opening of the storage case stored with the mini disk. Further, a wrapping film is wrapped thereon, thereby preventing a separation from the storage case. Hence, if a user who purchased this type of mini disk once tears up the wrapping film, the index card and the label are separated from the storage case and the mini disk. Consequently, as far as the index card and the label are previously pasted thereto, it must be inconvenient for the storage thereof, and it might also be conceived that a possibility of being lost is large.

While on the other hand, in the storage case disclosed in Japanese Patent Application Laid-Open No.9-226873, the cover member is so structured as to be rotatable with respect to the main body so that the index card can be encased inside the storage case, and hence the problem described above does not occur. In the above construction according to the prior art, however, the cover member does not open in a state where the mini disk is encased inside the storage case, in which state the index card can not be taken out. When trying to forcibly taking out the index card, the storage case might be damaged. Accordingly, the mini disk must be pulled out each time the index card is taken out of the storage case, which handling is inconvenient.

Further, the cartridge shown in FIG. 34A is, as shown in FIG. 34B, taken in and out of a storage case S. On this occasion, if the cartridge C is inclined in an arrow direction in the Figure, it might happen that a shutter edge portion 92 of the side surface 91 of the shutter member 90 impinges upon the inner surface of the storage case S. In this case, the edge portion 92 is an undercut by machining. Hence, as shown in FIG. 34C, if a burr 92a is formed at the edge portion 92, the inner surface of the storage case, upon which the shutter edge portion 92 impinges, is dented to form a recess s', which is an undesirable aspect.

SUMMARY OF THE INVENTION

It is a first object of the present invention to provide a storage case for a cartridge and a cartridge encased in the storage case, which are capable of, though simply constructed, facilitating a take-out of an index card and exhibiting an excellent handling property.

It is a second object of the present invention to provide a storage case for a cartridge and a manufacturing method thereof, which are capable of facilitating a take-out of the index card, ensuring the holding thereof and exhibiting an excellent handling property when the cartridge is inserted and pulled out, and also a storage case for a cartridge that is capable of eliminating a problem that an inner surface of the storage case might be dented when a shutter member of the cartridge impinges upon the inner surface thereof.

It is a third object of the present invention to provide a storage case for a cartridge which is capable of preventing the cartridge and the storage case from being damaged even when a force is exerted from outside, and causes no trouble in rotation of a cover member on the occasion of actualizing the storage case that facilitates the take-out of the index card, ensures the holding thereof and exhibits an excellent handling property when the cartridge is inserted and pulled out, and also a storage case for a cartridge in which the index card is easy to fit in, and a visual recognizing property of the index card is improved.

According to the first aspect of the invention, a storage case for a cartridge comprises a main body, a cover member rotatably supported on said main body and rotatable between an opening position and a closing position, an opening formed between said main body and said cover member when said cover member rotates to the closing position and for permitting an insertion of said cartridge from outside, and a lock member for preventing, when said cover member rotates to the closing position, the rotation thereof with respect to said main body, wherein said cover member includes a cartridge holding member for holding and integrally rotating, when rotating to the opening position, said cartridge inserted in between said main body and said cover member, and said cartridge to be inserted has a recessed portion, and said cover member includes a protruded portion engaging with the recessed portion when said cartridge is inserted, and a biasing member for giving an elastic force to the protruded portion engaging with the recessed portion, thereby preventing said cartridge from coming off.

In the cartridge storage case described above, the opening through which the cartridge can be inserted from outside when the cover member rotates to the closing position, is formed between the main body and the cover member. The cartridge storage case is further provided with the cartridge holding member for holding and integrally rotating the cartridge inserted in between the main body and the cover member when the cover member rotates to the opening position. Therefore, the cartridge encased in the storage case also rotates by rotating the cover member. Hence, the index card can be, even when disposed between the cartridge and the main body, taken out without pulling out the cartridge.

When the cover member rotates to the opening position, a sheet-like member is disposed between the main body and the cover member or can be taken out therefrom, and the cover member is formed with a sheet-like member holding member for holding the sheet-like member disposed between the main body and the cover member when the cover member rotates to the closing position.

The sheet-like member is formed with a notch corresponding to the sheet-like member holding member, and when the cover member rotates to the closing position, the sheet-like member holding member enters into the notch, thereby preventing the sheet-like member from coming off the cartridge storage case.

When the cover member rotates to the closing position, a groove is formed between the side surface of the cover member and the side surface of the main body.

The main body includes an engagement portion for regulating the entering of the cartridge with respect to the cover member when the cartridge is inserted into the cartridge storage case.

The sheet-like member holding member has a notched portion on the side of the opening, and the sheet-like member has an ear-like portion corresponding to the notched portion. When the cover member rotates to the closing position, the ear-like portion is interposed between the main body and the edge portion of the side surface of the cover member, whereby the sheet-like member can be prevented from floating in the vicinity of the opening.

According to the second aspect of the invention, a storage case for a cartridge, which capable of storing a sheet-like member and a cartridge, comprises a main body, a cover member, and a connecting member for connecting the main body to the cover member. The connecting member includes a spindle member provided on one of the main body and the cover member and a hole formed in the other of the main body and the cover member and engaging with the spindle member. The main body and the cover member are connected so that the cover member becomes rotatable between an opening position and a closing position with respect to the main body. The cartridge storage case also comprises an opening formed between the main body and the cover member when the cover member rotates to the closing position, and permitting an insertion of the cartridge from outside. When the cover member rotates to the opening position, the sheet-like member can be taken in and out irrespective of whether or not the cartridge is stored in the cartridge storage case.

In the cartridge storage case described above, the connecting member is constructed of the spindle member provided on one of the main body and the cover member, and the hole formed in the other of the main body and the cover member and engaging with the spindle member. Although simply constructed, the cover member is rotatable between the opening position and the closing position with respect to the main body. When the cover member rotates to the closing position, the opening, through which the cartridge can be inserted and pulled out from outside, is formed between the main body and the cover member, thereby facilitating the take-in and take-out of the cartridge. On the other hand, when the cover member rotates to the opening position, the sheet-like member such as, e.g., an index card can be taken in and out irrespective of whether or not the cartridge is encased in the cartridge storage case. Hence, even when index card is disposed between the cartridge and the main body, the index card can be taken out without pulling out the cartridge.

The cover member is provided with a pair of spindle members facing to each other, and the main body is formed with a pair of holes corresponding to the spindle members. The cover member is formed with recessed portions in the vicinity of the spindle members, and the recessed portions relieve a stress based on an elastic deformation when the spindle members engage with the holes.

The recessed portions are formed in such positions as not to interfere with the cartridge stored in the cartridge storage case.

At least one of the spindle member and the hole has a guide surface for guiding when the spindle member engages with the hole.

The holes are formed at two edges of a protruded portion provided on an upper portion of a depthwise wall formed on the side opposite to the opening of the main body, and the edge portion, on the side of the opening, of the hole shifts toward the opening from an inner surface of the depthwise wall which is disposed outwardly of at least the hole.

The cartridge storage case further comprises a rib for connecting the protruded portion to the bottom wall of the main body along the depthwise wall.

The cartridge storage case further comprises a closing member entering into the recessed portion when the cover member rotates to the closing position.

According to the third aspect of the invention, when the cover member rotates to the closing position, a lower edge of the cartridge holding member enters into the recessed portion formed in the inner surface of the main body, and an upper edge thereof is more protruded than the inner surface of the main body.

In the cartridge storage case explained above, when the cover member rotates to the closing position, the lower edge of the cartridge holding member enters into the recessed portion formed in the inner surface of the main body, and the upper edge thereof is more protruded from the inner surface of the main body. The index card can be thereby sandwiched in between the lower edge of the cartridge holding member and the recessed portion in the inner surface of the main body, and hence the holding of the index card is ensured. Further, the upper edge of the cartridge holding member protrudes, and there is formed a spacing from the inner surface of the main body. Therefore, in the case where the index card is disposed between the cartridge and the main body, the cartridge never rubs against the index card even when the cartridge is taken in and out, which is excellent of a handling property by facilitating the cartridge to be inserted and pulled out.

A cartridge introducing portion for facilitating the insertion of the cartridge is provided at the edge portion, on the side of the opening, of the cartridge holding member. This facilitates the introduction of the cartridge to the cartridge holding member.

The cartridge introducing portion has an oblique surface portion or a stepped portion, and a front edge, on the side of the opening, of the oblique surface portion or the stepped portion is lower than the inner surface of the main body when the cover member rotates to the closing position. With this contrivance, the cartridge can be, when in the take-in/out process, smoothly inserted and pulled out with no sense of being caught, which makes the handling easier. Especially when the cartridge is inserted, there is received no such resistance as to be caught on the front edge of the cartridge holding member, which gives a preferable aspect.

A protruded portion for positioning the cartridge is provided at a corner of the surface of the cover member, which faces to the side surface of the cartridge when holding the cartridge. With this configuration, when the cartridge is held by the cartridge holding member, the spacing is defined by the protruded portions provided at the corners between the side surface of the cartridge and the surface of the cartridge holding member. Therefore, even in the case where the cartridge is obliquely inserted, for example, the shutter edge portion provided on the side surface of the cartridge does not impinge upon the surface of the cartridge holding member, thereby making it feasible to prevent such inconvenience that the surface is dented.

When the cover member rotates between the opening position and the closing position, the main body is formed with a protrusion at which the main body is brought into contact with the cover member. With this construction, when the cover member is opened and closed, the cover member is brought into contact with the main body at this protrusion, which ensure the opening and closing of the cover member. It is also possible to restrain a backlash of the cover member when the cover member rotates to the closing position.

It is desirable that the protruded portion engaging with the recessed portion which is provided on the side surface of the cartridge when the cartridge is inserted, and the cartridge holding member are disposed in different positions of the cover member. In the case of manufacturing the above-described cover member by forming it using a mold, this protrusion and the cartridge holding member contain undercuts in terms of a structure of the mold, and hence the mold involves the use of an inclined slide and a slide core. If the cover member is structured so that the protrusion becomes close to the cartridge holding member, a strength of the mold using the inclined slide and the slide core might decline. Therefore, the strength of the mold can be enhanced by disposing these two components in different positions.

A rotary member engaging so that the cover member rotates with respect to the main body is disposed in a position, different from those of the protruded portion and the cartridge holding member, of the cover member, whereby the strength of the mold for forming the cover member can be enhanced.

A method of manufacturing a storage case for a cartridge, comprises a step of forming an outer surface of a cover member by a fixed mold, a step of forming an inner surface thereof by a movable mold, a step of forming a cartridge holding by a first mold member, and a step of forming a protruded portion by a second mold member movable in a direction different from that of the first mold member. According to this method, the cover member including the protruded portion and the cartridge holding member which contain undercuts in terms of a mold structure when in the forming process, can be manufactured with an enhanced strength of the mold and with an extended life-span of the mold. it is therefore feasible to improve the productivity of the cartridge storage case. The first and second mold members described above may be constructed having a structure for working the undercuts so formed as to be included in the protruded portion and the cartridge holding member.

According to the fourth aspect of the invention, a rib member higher than a thickness of the cartridge is provided in the vicinity of the edge portion, on the side of the rotary spindle, of the cover member.

In the cartridge storage case described above, since the rib member provided in the vicinity of the edge portion, on the side of the rotary spindle, of the cover member, is higher than the thickness of the cartridge, when the cover member is in the closed position, the rib member of the cover member impinges ahead upon the main body even by pressing strong the cover member and the main body on the side of the rotary spindle. consequently, the cover member and the main body have almost no deformations and are not brought into contact with the cartridge, thereby making it possible to prevent the cartridge and the storage case from being damaged.

When the protruded portion of the cover member engages with the recessed portion after the cartridge has been inserted, the rib member is disposed so that the rib member becomes close to the side surface, on the inserting side, of the cartridge. Based on this construction, the recessed portion of the cartridge engages with the protruded portion of the cover member, and the cartridge is firmly held with the aid of the biasing member. The side surface of the cartridge becomes close to the rib member when engaged, and therefore cartridge can be held more firmly by restraining a backlash of the as-encased cartridge.

The main body includes a bottom portion having a plane portion and a back cover sheet and capable of storing an L-shaped index card, and a side wall provided on the side of the rotary spindle. When the cover member rotates to the closing position, the rib member guides the back cover sheet of the index card on the bottom portion toward the side wall. According to this construction, even if the index card is completely stored in the main body, with the rotational operation of the cover member to the closing position, the rib member presses the back cover sheet of the index card against the side wall, whereby the index card can be automatically surely stored and becomes easy to fit. In this case, as explained above, if structured so that the rib member gets close to the side surface of the cartridge, the spacing between the main body and the side wall is narrowed when the cover member is in the closing position, and the back cover sheet of the index card is positioned in this narrow spacing. Hence, even in such a case that the back cover sheet of the index card is not so bent as to stand erect, it is closely fitted to the sidewall of the main body. As a result, display information on the back cover sheet of the index card is easily read, thus improving a visual recognizing property of the index card.

When the cover member is in the closing position, the rib member presses the plane portion of the index card stored on the bottom portion of the main body. Based on this construction, for instance, the rib member is set to such a height as to come into contact with the plane portion. With this contrivance, the rib member presses the plane portion of the index card against the bottom portion of the main body, and hence it is feasible to certainly prevent floating and a deviation of the index card in the main body.

The rib member may be provided in a part of the vicinity of the edge portion on the side of the rotary spindle. It is not required that the rib member be provided extending from one end to the other end of the portion provided with the cartridge holding member of the cover member, and may also be provided partially or intermittently therebetween.

Further, the storage case into which the cartridge is encased can be provided by setting the cartridge in the thus constructed storage case.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 4 is a perspective view showing a main body in FIG. 2;

FIG. 31A is a sectional view showing a mold taken along the line a—a in FIG. 30, which corresponds to a holding member of the cover member; FIG. 31B is a sectional view of the mold, showing a movement when in a releasing process of the mold in FIG. 31A;

Figure 7:
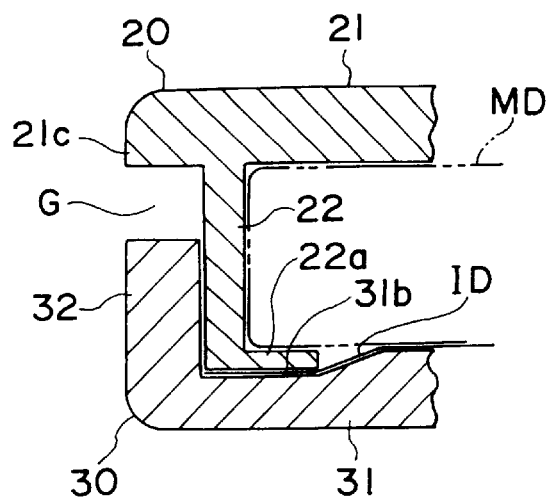
FIG. 7 is a view showing the storage case in section taken along the line VII—VII in FIG. 6 as viewed in an arrow direction.
Figure 45:
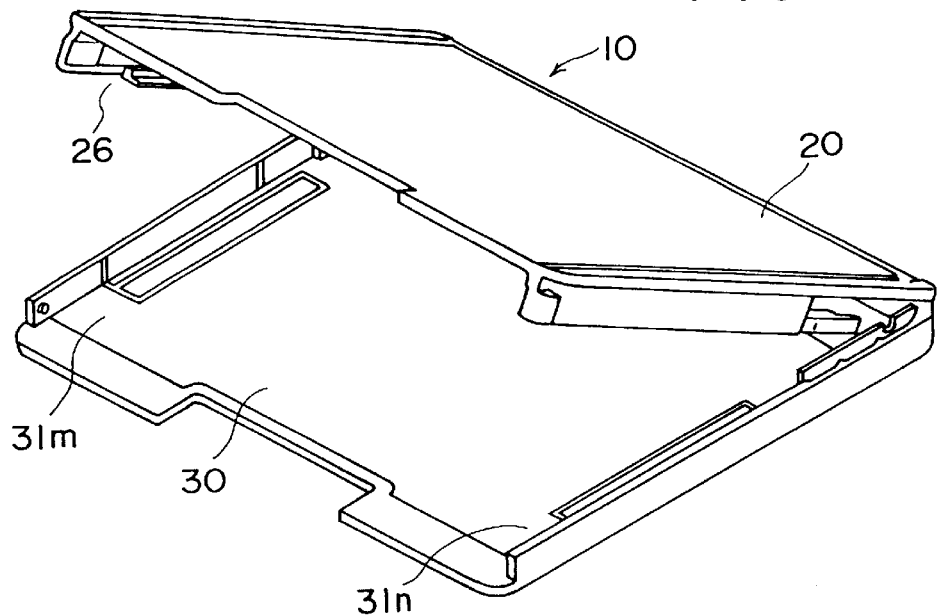
FIG. 45 is a perspective view showing the storage case in the state where the cover member is opened in a modified example of the first embodiment.
Figure 46:
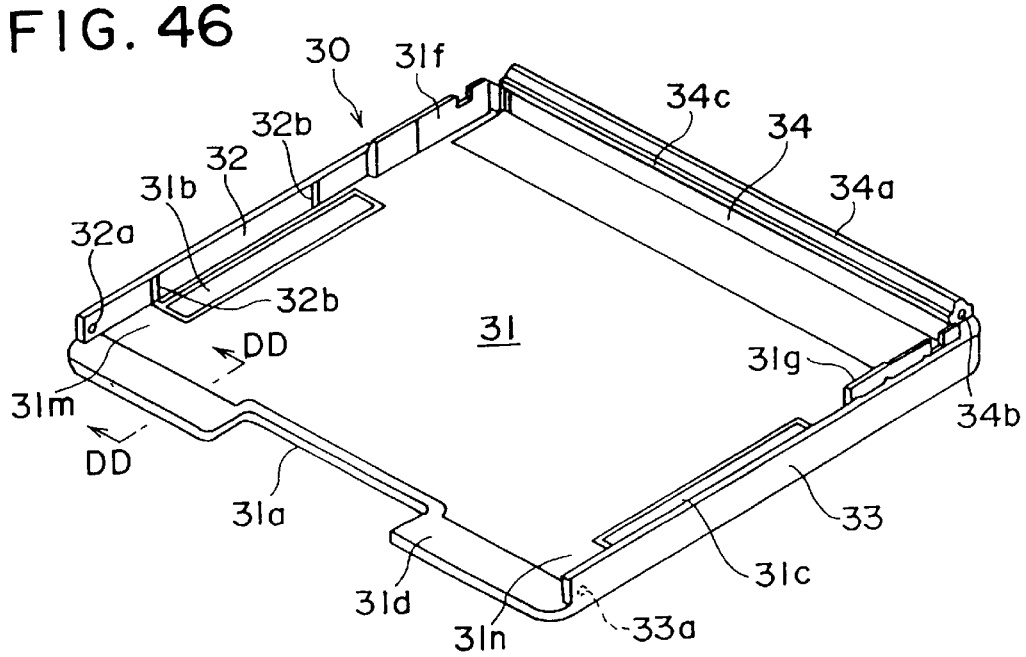
FIG. 46 is a view showing the main body of the storage case in FIG. 45.
Figure 49:
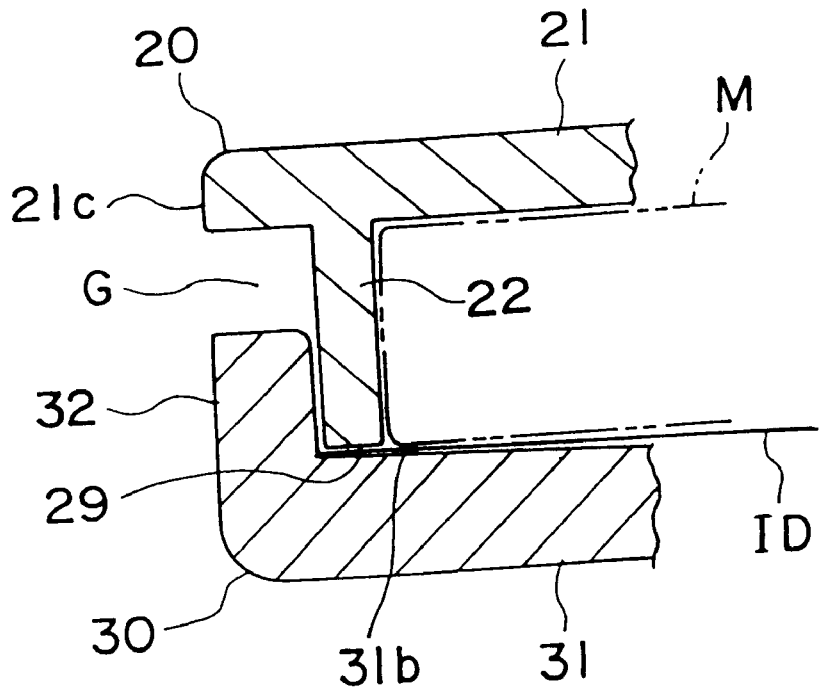
Figure 50:
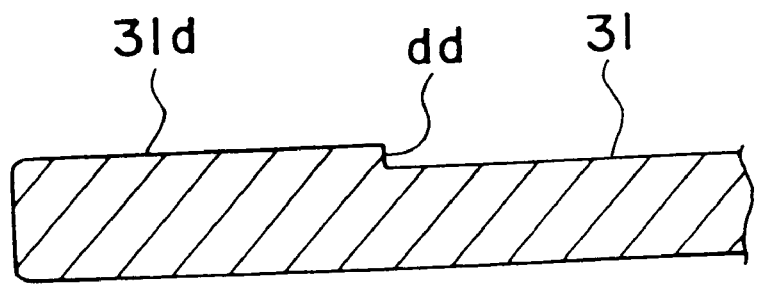

FIG: 48 is a perspective view showing the index card usable for the storage case in FIG. 45;

FIG. 49 is a sectional view, similar to FIG. 7, showing the vicinity of an opening in the state where the storage case in FIG. 45 is closed; and FIG. 50 is a sectional view showing the main body as viewed in a direction along the line DD—DD in FIG. 46.

DESCRIPTION OF THE PREFERRED EMBODIMENTS

Embodiments of the present invention will hereinafter be described with reference to the accompanying drawings.

<First Embodiment>

Figure 1:
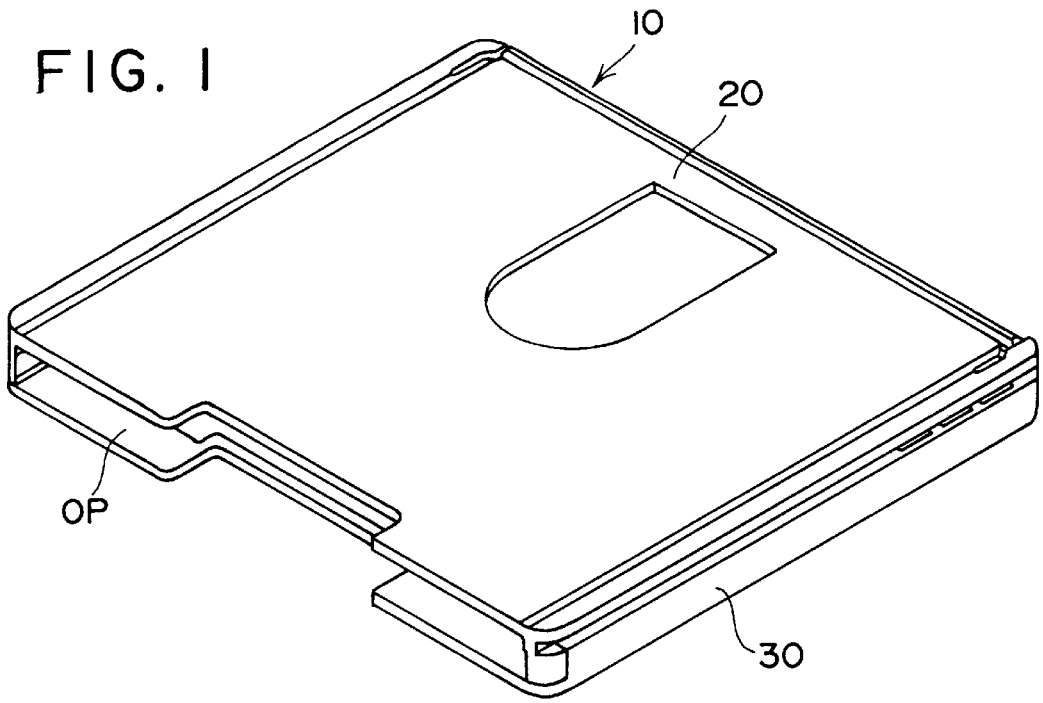
FIG. 1 is a perspective view showing a storage case capable of storing a mini disk in a first embodiment, and showing a state where a cover member is closed.
Figure 2:
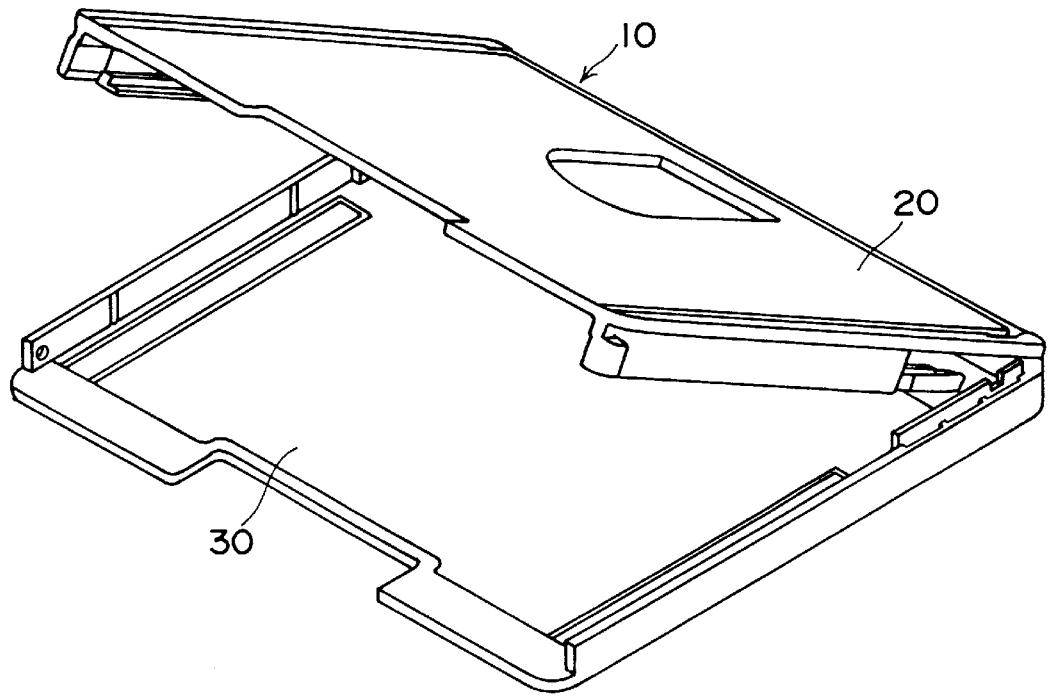
FIG. 2 is a perspective view showing the storage case capable of storing the mini disk in the first embodiment, and showing a state where the cover member is opened.

FIGS. 1 and 2 are perspective views each showing a storage case capable of encasing a mini disk ina first embodiment. FIG. 1 shows a state where a cover member is closed (i.e., the cover member is in a closing position). FIG. 2 shows a state where the cover member is opened (i.e., the cover member is in an opening position).

Figure 12:
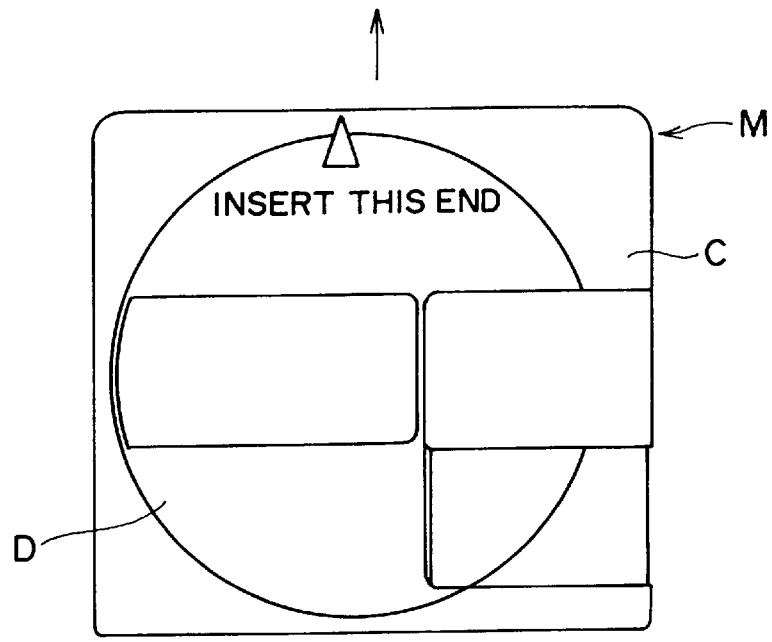
FIG. 12 is a view showing an upper surface of a mini disk M by way of one example thereof.
Figure 13:
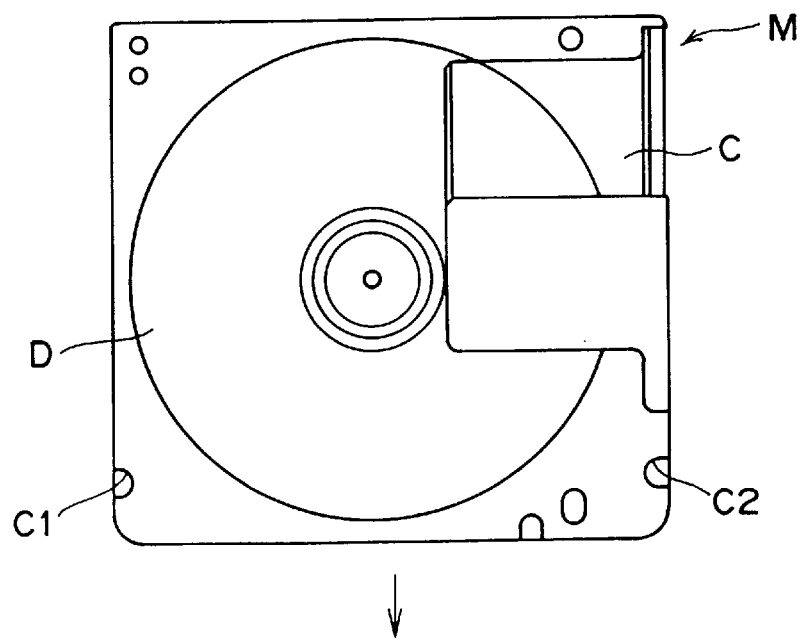
FIG. 13 is a view showing a lower surface of the mini disk M by way of one example thereof.

Referring to FIGS. 1 and 2, a thin box-like storage case 10 is constructed of a cover member 20 and a main body 30 defined as a separate member from the cover member 20. As illustrated in FIG. 1, the storage case 10 is formed with an opening OP at a front surface thereof, through which a mini disk M (FIGS. 12 and 13) can be taken in and out. Incidentally, it is preferable that the main body 30 and the cover member 20 be composed of a resin exhibiting transparency such as polycarbonate resin, polystyrene resin, acrylic resin and AS resin.

Figure 5:
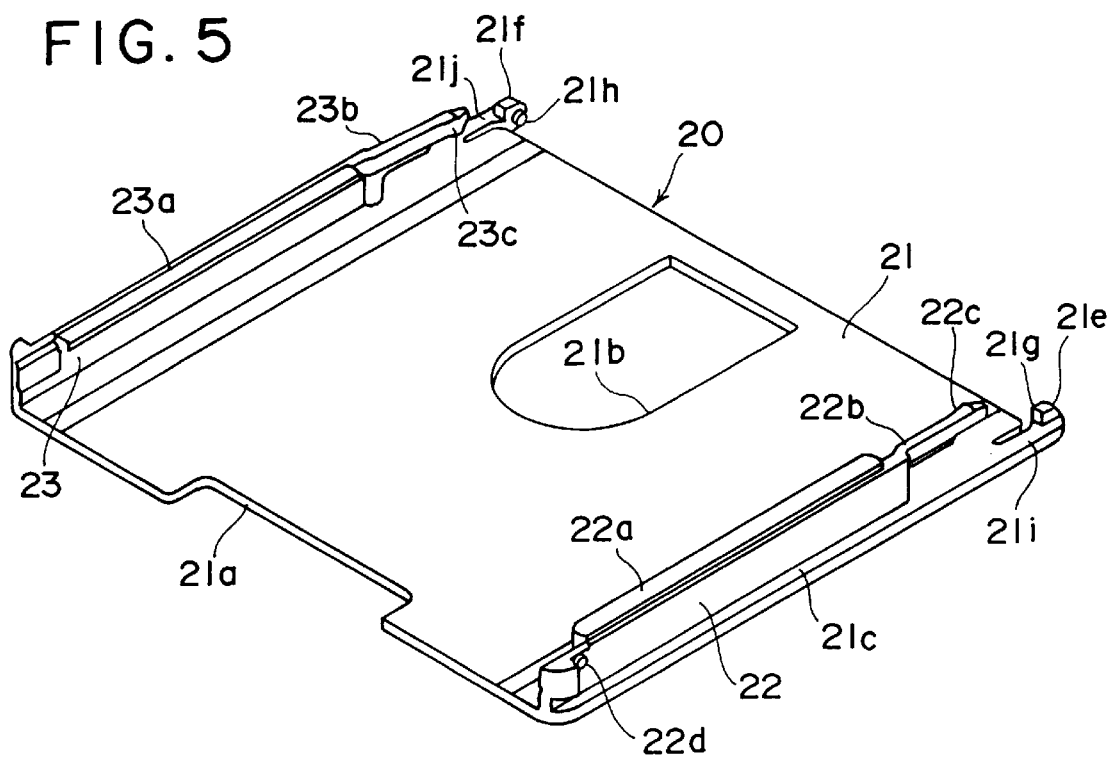
FIG. 5 is a perspective view showing an underside of the cover member in FIG. 3 when reversed.
Figure 3I:
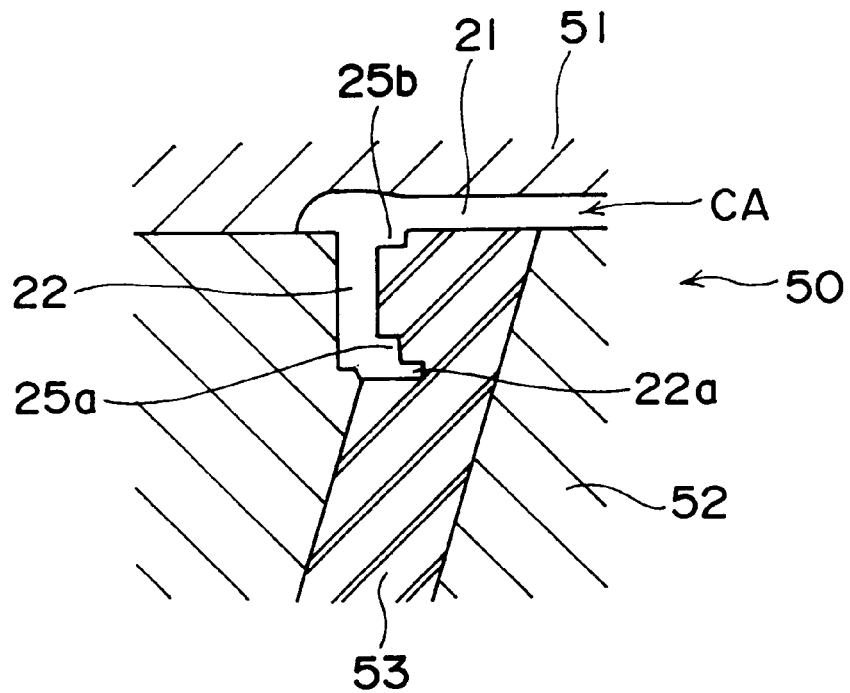
FIG. 3 is a perspective view showing the cover member in FIG. 2.
Figure 3I:
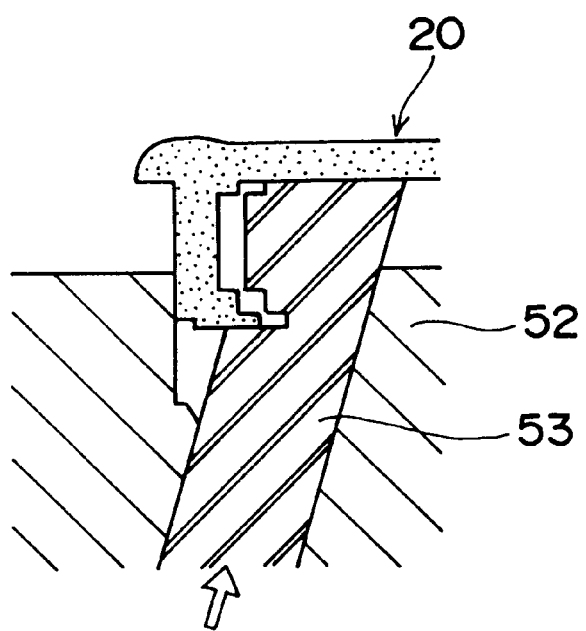

FIG. 3 is a perspective view showing only the cover member 20. FIG. 4 is a perspective view showing only the main body 30. FIG. 5 is a perspective view showing the underside of the cover member 20 when reversed. Referring first to FIG. 4, to begin with, the main body 30 is explained. The main body 30 is integrally constructed of a rectangular bottom wall 31, a left side wall 32 connected to one side of the bottom wall 31, a right side wall 33 connected to one side facing to the above one side, and a depthwise wall 34 connected to one side of the bottom wall 31 and orthogonal to two side walls 32, 33. The bottom wall 31 is formed with a rectangular notched portion 31a along one side facing to the one side to which the depthwise wall 34 is connected (which is hereinafter referred to as an opening-formed side). Further, the bottom wall 31 is formed with shallow elongate recessed portions 31b, 31c respectively in the vicinities of the left side wall 32 and of the right side wall 33. In addition, the bottom wall 31 is formed, in the vicinity of the depthwise wall 34, with plate members 31f, 31g extending in parallel to the side walls 32, 33. A stepped portion 31d is formed slightly higher in close proximity to the opening-formed side of the bottom wall 31.

The side walls 32, 33 have holes 32a, 33a formed at end portions close to the opening-formed side. A rod-like support member 34a is provided extending over an entire width thereof along an upper edge of the depthwise wall 34, of which both ends are formed with holes 34b (one hole is illustrated). The support member 34a includes an engagement portion 34c overhanging toward the opening-formed side from the depthwise wall 34.

Referring next to FIGS. 3 and 5, the cover member 20 is described. The cover member 20 comprises a rectangular upper wall 21 and two side walls 22, 23 connected to the upper wall 21. The upper wall 21 is formed with a rectangular notched portion 21a along a side (an opening-formed side) facing to the opening-formed side of the main body 30 (FIG. 4), and with an extrusion opening 21b in the vicinity of the center thereof. The extrusion opening 21b is formed to have a size enough to enable a finger of the hand to insert therein. The extrusion opening 21b is convenient for taking out the mini disk M and, the mini disk M exposed from the notched portion 21a being possible of its being seized and thus removed by the fingers, is not therefore necessarily indispensable.

The side walls 22, 23 are connected to the vicinities of the two face-to-face sides of the upper wall 21, and therefore the upper wall 21 includes overhangs 21c, 21d extending outwardly of the side walls 22, 23. Knot-like support members 21e, 21f are provided at edges, opposite to the opening-formed side, of the overhangs 21c, 21d serving as stepped portions. Further, the support members 21e, 21f are formed with spindle members 21g, 21h facing to each other and each taking a short cylindrical shape. Tips of the spindle members 21g, 21h are slightly tapered. The support members 21e, 21f are connected to the upper wall 21 through elongate arms 21i, 21j.

The side walls 22, 23 have elongate plate members 22a, 23a formed facing to each other at lower edges (upper edges in FIG. 5) thereof. Further, cantilever arms 22b, 23b are connected to end portions, opposite to the opening-formed side, of the side walls 22, 23. Tips of the arms 22b, 23b are provided with swellings 22c, 23c. Further, side walls 22, 23 are provided with protruded portions 22d (FIG. 5) and 23d (FIG. 3) protruding in such a direction as to separate away from each other in the vicinities of the end portions proximal to the opening-formed side.

Figure 6:
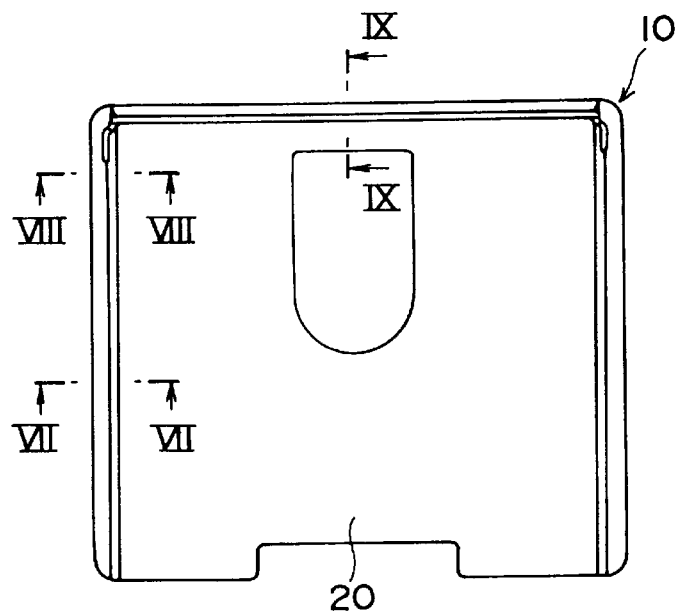
FIG. 6 is a top view showing the storage case in FIG. 1 in a state where the cover member is closed.
Figure 8:
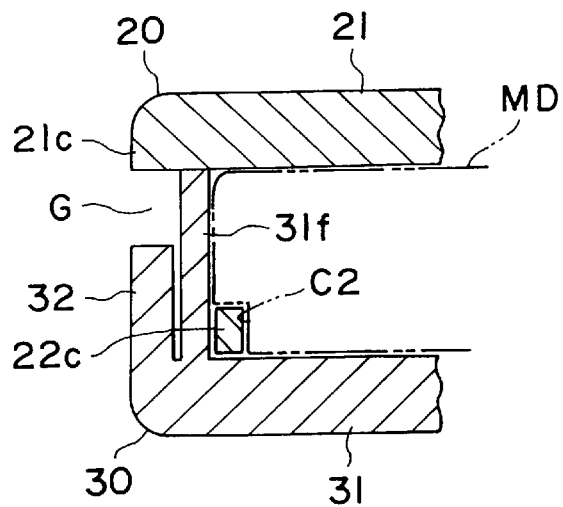
FIG. 8 is a view showing the storage case in section taken along the line VIII—VIII in FIG. 6 as viewed in an arrow direction.
Figure 9:
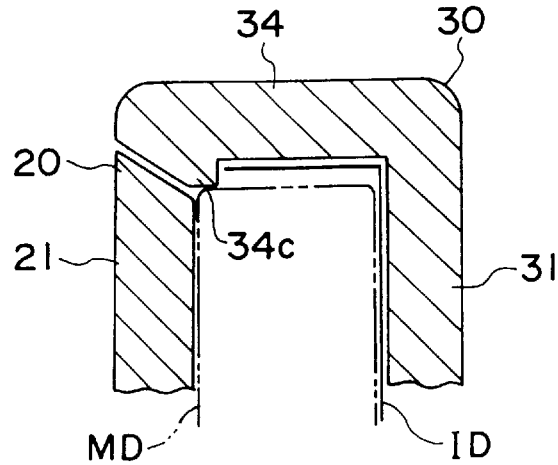
FIG. 9 is a view showing the storage case in section taken along the line XI—XI in FIG. 6 as viewed in an arrow direction.

FIG. 6 is a top view showing the storage case 10 in a state where the cover member 20 is closed. FIG. 7 is a view of the storage case 10 in section taken along the line VII—VII in FIG. 6 as viewed in an arrow direction. FIG. 8 is a view of the storage case 10 in section taken along the line VIII—VIII in FIG. 6 as viewed in an arrow direction. FIG. 9 is a view of the storage case 10 in section taken along the line XI—XI in FIG. 6 as viewed in an arrow direction. FIGS. 7 and 8 show only the components peripheral to the side wall 32 of the main body 30, however, the construction on the side of the side wall 33 is also the same.

As illustrated in FIG. 7, in the state where the cover member 20 is closed, the plate member 22a formed on the side wall 22 comes into contact with the recessed portion 31b of the main body 30. Further, the mini disk M inserted into the storage case as indicated by two-dotted line is held between the plate member 22a and the upper wall 21. An upper surface of the plate member 22a (23a) constitutes a cartridge holding portion, while a lower surface of the plate member 22a (23a) constitutes a sheet-like member holding portion.

Furthermore, as shown in FIG. 8, when the mini disk M is inserted into the storage case, the swelling 22c defined as a protruded portion enters into a cavity C2 thereof. In section shown in FIG. 8, the plate member 31f impinges upon the cover member 20, thus making tight closing therebetween. The reason therefor is that the cover member 20 is provided with the swelling 22c, and hence the mold, if the cover member 20 is formed with the plate member 31f, becomes complicated enough to increase the costs. Incidentally, a groove G assuming a rectangular shape in section is, though obvious from FIGS. 7 and 8, formed between the overhang 21c of the cover member 20 and the main body 30.

As shown in FIG. 9, when the mini disk M is inserted into the storage case, an inward edge thereof impinges upon the engagement portion 34c of the main body 30 and is thus unable to advance more inwards.

Figure 10:
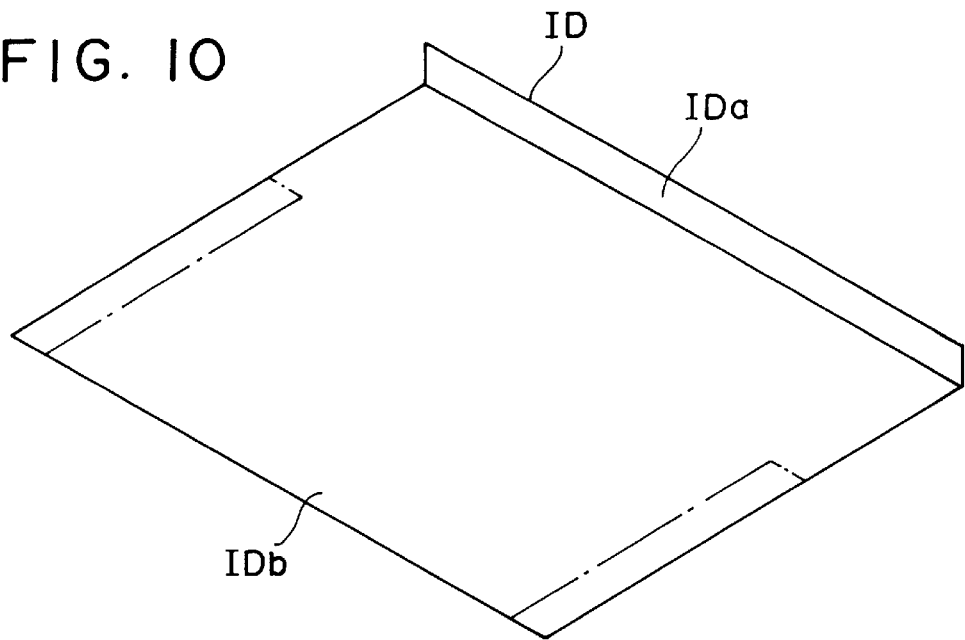
FIG. 10 is a perspective view showing an index card usable for the storage case in every embodiment.
Figure 11:
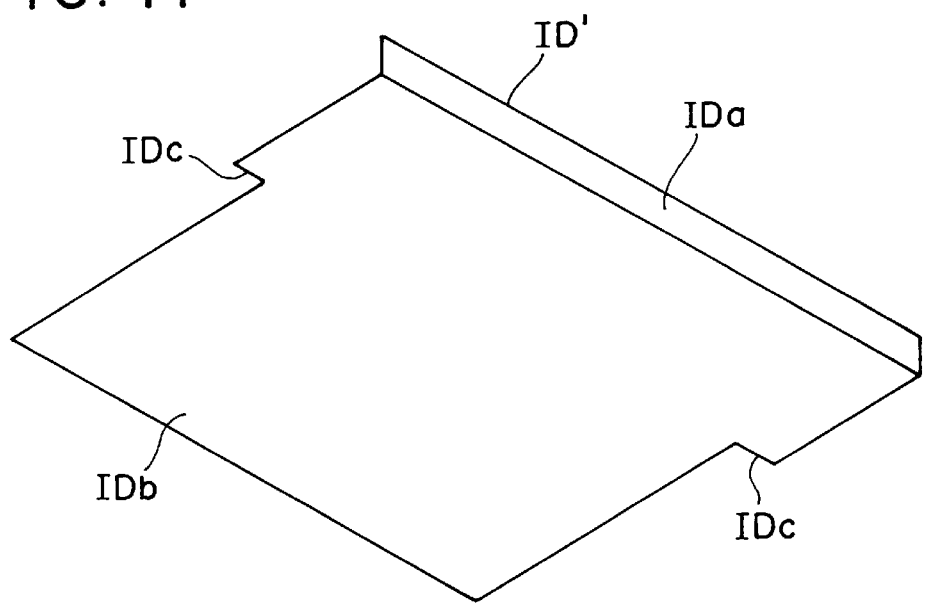
FIG. 11 is a perspective view showing a modified example of the index card usable for the storage case in every embodiment.

FIG. 10 is a perspective view illustrating an index card usable for the storage case 10 in the first embodiment. FIG. 11 is a perspective view showing a modified example thereof. Referring to FIG. 10, the index card ID classified as a sheet-like member is structured by folding a sheet of rectangle paper and comprises a strip back cover sheet portion IDa and a wide entry portion IDb.

As shown in FIG. 1, when assembling the main body 30 and the cover member 20, the spindle members 21g, 21h of the cover member 20 are fitted into the holes 34b (FIG. 4) of the main body 30 while elastically deforming the arms 21i, 21j (FIG. 5). With the operation thus done, the cover member 20 becomes rotatable about the spindle members 21g, 21h with respect to the main body 30.

Given next is an explanation of an operation in the first embodiment when the index card is encased in the storage case 10. To start with, as shown in FIG. 2, the cover member 20 is turned up to a position in which the cover member 20 is opened with respect to the main body 30. Subsequently, the index card ID shown in FIG. 10 is inserted thereinto so that the back cover sheet IDa faces to the side wall 34 (FIG. 4) of the main body 30. When the cover member 20 is turned down to a closing position illustrated in FIG. 1 from the state described above, the encasing of the index card is completed. In the state where the cover member 20 is closed, the protruded portions 22d (FIG. 5) and 23d (FIG. 3) of the cover member 20 remain engaged with the holes 32a, 33a of the main body 30, and therefore it never happens that the cover member 20 rotates by accident with respect to the main body 30. While on the other hand, when trying to take out the index card, the operation reversal to the procedure explained so far may be performed. The protruded portions 22d, 23d and the holes 32a, 33a constitute lock members.

The operation described above can be executed irrespective of whether or not the mini disk M is encased in the storage case 10. This is because the mini disk M rotates together with the cover member 20, which does not interfere with the take-in/out of the index card. It is to be noted that the main body 30 and the cover member 20 are composed of the transparent resin, and hence the user is able to read characters written on the back cover sheet IDa and the entry portion IDb of the index card ID from outside of the storage case 10.

In accordance with the first embodiment, the index card ID is disposed within the main body 30, and then the cover member 20 is closed, whereby the index card ID is, as shown in FIG. 7, fixed with its side edge pressed in the recessed portion 31b of the main body 30 by the plate member 22a of the cover member 20. Accordingly, even when the mini disk M is not stored in the storage case 10, the index card ID is firmly fixed and never falls by accident off the storage case 10 via the opening OP (FIG. 1). It should be noted that when pressed in the recessed portion 31b by the plate member 22a, the index card ID is never, though the side edge thereof might be slightly bent, torn up because of the recessed portion 31b being shallow.

If it is considered undesirable that the index card is bent to the slightest degree, an index card ID' shown in FIG. 11 may be useful. The index card ID' illustrated in FIG. 11 is similar to what is shown in FIG. 10 but has a difference that rectangular notches IDc are formed at two side edges of the entry portion IDb. The notch IDc takes substantially the same configuration as the recessed portion 31b of the main body 30, and therefore the plate member 22a of the cover member 20 is fitted into the notch IDc by disposing the index card ID' in the main body 30 and closing the cover member 20. Accordingly, even when the cover member 20 is closed, the index card ID' is never bent, and the notch IDc is caught on the plate member 22a, whereby the index card never falls by accident off the storage case 10 via the opening OP even when the minidisk M is not stored in the storage case 10.

Next, there will be explained an operation in the first embodiment when the mini disk M is encased in the storage case 10. As in the sleeve type according to the prior art, the mini disk M can be taken in and out of the storage case 10 in the state where the cover member 20 is closed in accordance with the first embodiment. As discussed above, when the mini disk M is inserted into the storage case, the inward edge thereof impinges upon the engagement portion 34c (FIG. 9) of the main body 30 and is thus unable to advance more inwards. When trying to make the mini disk M enter till the inward edge thereof impinges upon the side wall 34, there might be a possibility in which the cover member 20 can not be opened in such a state, and the storage case, if forcibly opened, might be damaged.

Moreover, when the mini disk M is inserted into the storage case 10 while the cover member remains closed, the stepped portion 31d formed on the opening side of the main body 30 is higher by a thickness of the card than the bottom wall 31 on which the index card ID is disposed so that the index card ID previously disposed inside does not hinder the storage case 10 from advancing.

In the case of taking the mini disk M out of the storage case 10 with the cover member 20 closed, the user may press the finger of his or her hand against the mini disk M exposed from the extrusion opening 21b of the cover member and thus push the mini disk M out, or may draw out the mini disk M by holding the mini disk M exposed from the central notches 21a, 31a.

The mini disk M can be inserted along the lower surface of the cover member 20 in the state of the cover member 20 being opened. In such a case, the inward edge of the mini disk M impinges upon the engagement portion 34c (FIG. 9), and the cavities C1, C2 thereof engage with the swellings 22c, 23c of the cover member 20, with the result that the mini disk M is held by the cover member 20. Furthermore, in the first embodiment, the groove G (i.e., a gap) is, as shown in FIGS. 7 and 8, formed between the main body 30 and the cover member 20. Accordingly, with the use of this groove G, the storage case in the first embodiment can be housed in a container for housing a plurality of storage cases as disclosed in, e.g., Japanese Patent Application Laid-Open No.8-295385.

Next, a modified example of the first embodiment will be described. The storage case in this modified example is constructed in such a way that opening-side portions of the holding members 22a, 23a of the cover member 20 which serve to hold the mini disk, are notched as shown in FIG. 45, and recesses 31b, 31c of the main body which correspond thereto are partially flattened. Therefore, the explanation is concentrated upon only different configurations.

Figure 47:
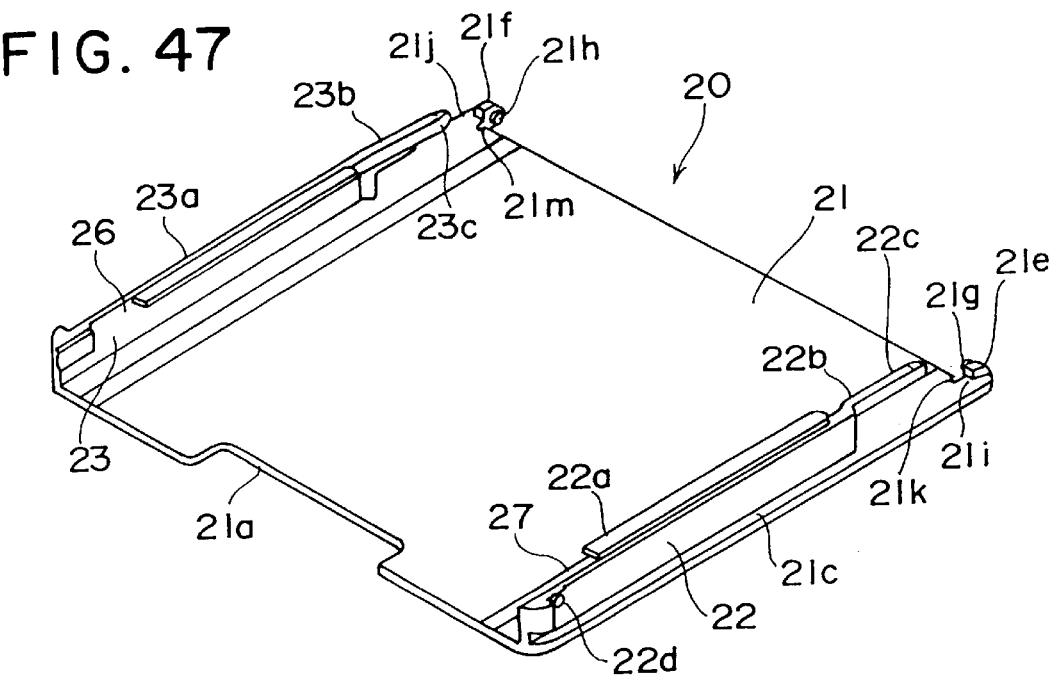
FIG. 47 is a perspective view showing the cover member of the storage case in FIG. 45.

As illustrated in FIG. 47, the opening-side portions of the plate members 22a, 23a constituting the sheet-like member holding members are partially notched to form notched portions 26, 27. Further, as shown in FIG. 46, flat portions 31m, 31n are formed in close proximity to the recesses 31b, 31c of the main body 30, corresponding to the notched portions 26, 27. An index card IID shown in FIG. 48 include ear members IDd at both ends in addition to what is shown in FIG. 11.

Figure 48:
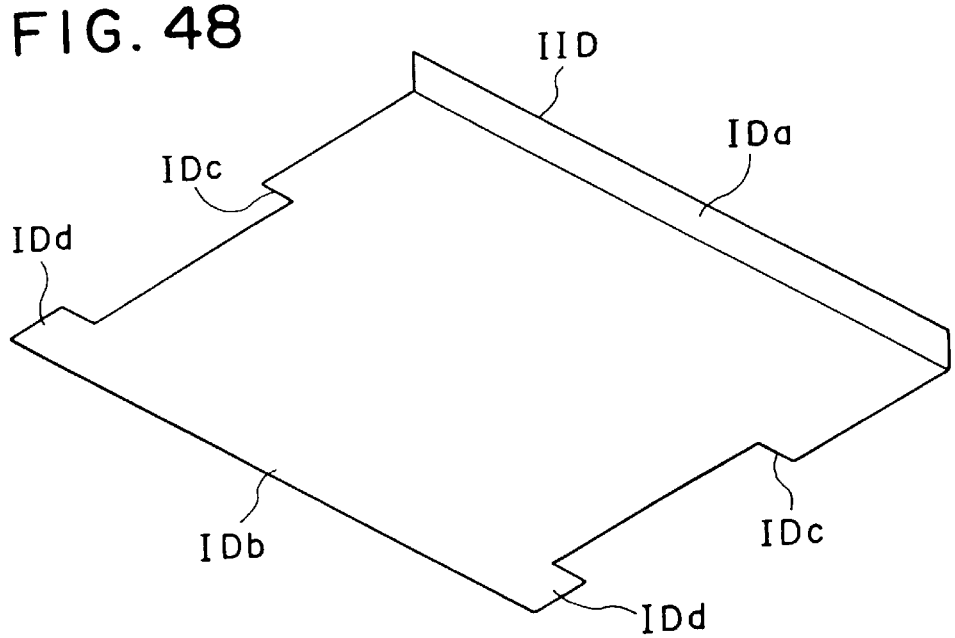

The index card IID in FIG. 48 is encased in the storage case in FIG. 45, and the cover member is closed, at which time, as shown in FIG. 49, the ear member IDd of the index card IDD is sandwiched in between the flat portion 31m and a front edge 29 of the side wall 22 of the cover member, thus firmly holding the index card on the opening side. The index card ID' in FIG. 11 can not be, even when the cover member is closed, pressed on the opening side even when the cover member is closed and consequently floats. This floating, if under a level difference dd shown in FIG. 50, does not affect. If over the level difference dd, however, the mini disk is, on the occasion of its being encased therein, caught on the index card with the result that the mini disk can not be inserted. In accordance with the present modified example, however, the ear member of the index card is sandwiched in between the main body and the front edge of the side wall of the cover member in the vicinity of the opening, thereby making it feasible to prevent the floating of the index card at the opening.

The present invention has been so far discussed by way of the embodiment but should not be construed as being limited to the embodiment described above. The present invention can be of course properly modified and improved. For instance, the present invention can be applied to storage cases for storing a CD and other cartridges without being confined to the mini disk.

The storage case for the cartridge in the first embodiment includes the opening, formed between the main body and the cover member, through which to permit the insertion of the cartridge from outside when the cover member rotates to the closing position, and further the cartridge holding member for holding the cartridge inserted in between the main body and the cover member and integrally rotating it when the cover member rotates to the opening position. Therefore, the cartridge encased in the storage case also rotates by rotating the cover member. The index card can be, even when disposed between, for example, the cartridge and the main body, fetched without pulling out the cartridge.

<Second Embodiment>

The storage case capable of storing the mini disk in a second embodiment has the same construction as the one shown in FIG. 9, and therefore the same components are marked with the like numerals, of which the explanation is omitted.

Figure 14:
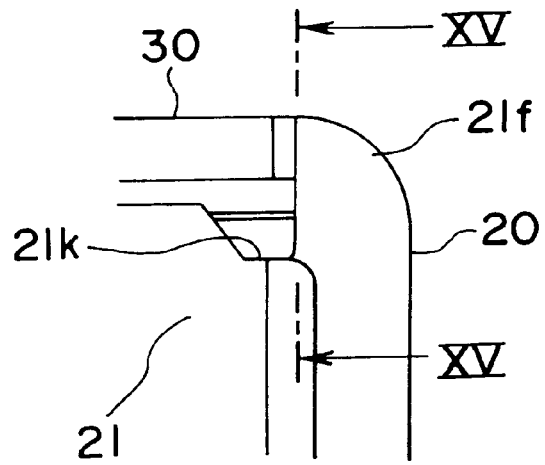
FIG. 14 is an enlarged view showing a corner of a rear edge portion of the storage case capable of storing the mini disk in a second embodiment.
Figure 15:
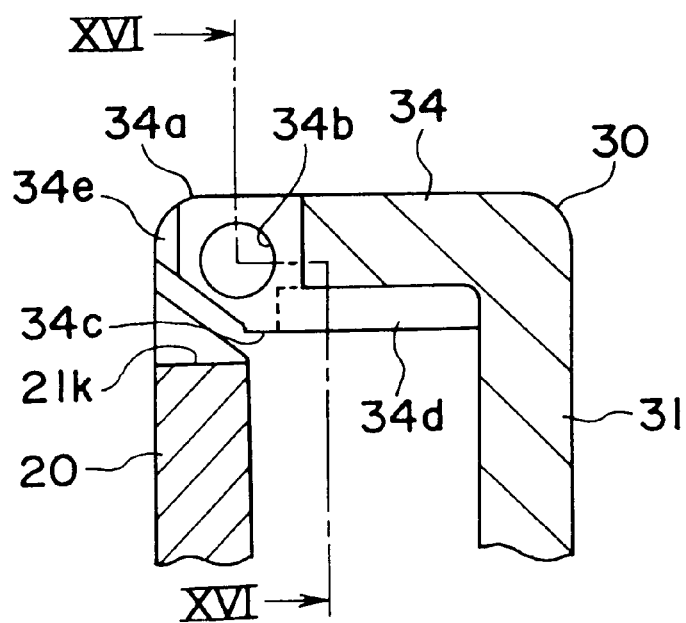
FIG. 15 is a view showing the main body of the storage case in section taken along the line XV—XV in FIG. 14 as viewed in an arrow direction.
Figure 16:
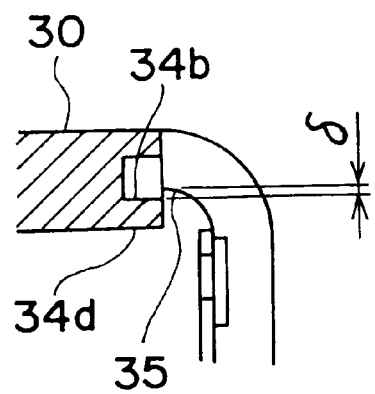
FIG. 16 is an enlarged view, similar to FIG. 14, showing only a depthwise wall 34 in section taken along the line XVI—XVI in FIG. 15 when a cover member 20 is removed.
Figure 17:
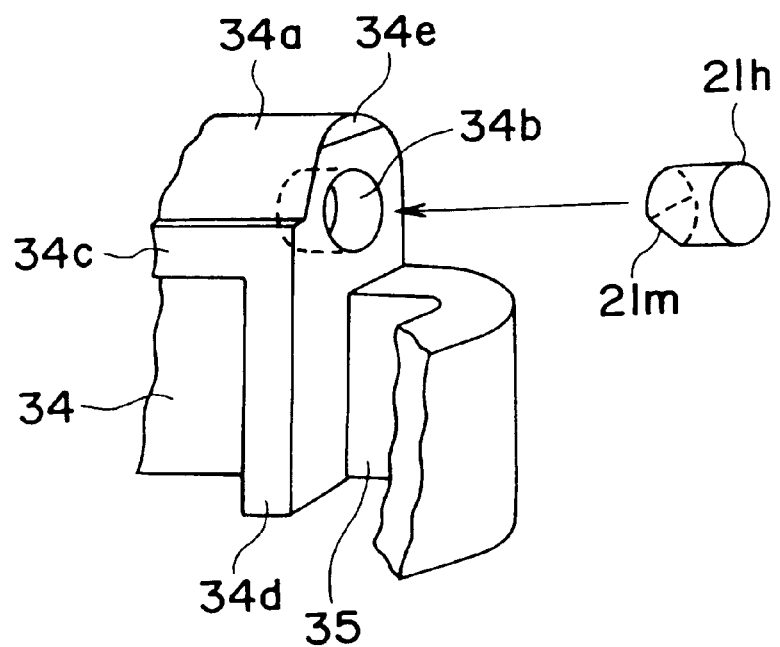
FIG. 17 is a perspective view showing the vicinity of a hole in the main body of the storage case in FIG. 14.

FIG. 14 is an enlarged view showing a corner portion at the rear edge of the storage case in the second embodiment. FIG. 15 is a view in section taken along the line XV—XV as viewed in an arrow direction, showing the main body 30 of the storage case in FIG. 14. FIG. 16 is a view in section taken along the line XVI—XVI, showing only the depthwise wall 34 with the cover member removed in FIG. 15 as well as being an enlarged view similar to FIG. 14. FIG. 17 is a perspective view showing the vicinity of the hole of the main body 30. Throughout those Figures, the spindle member of the cover member is also shown together. The construction including the spindle member and the hole is explained in greater details with reference to the drawings. The explanation is, however, concentrated on one of paired spindle members each having the same configuration and one of paired holes also assuming the same configuration.

As shown in FIG. 15, the protruded member 34a formed at an upper edge (a left edge in FIG. 15) of the depthwise wall 34 takes a trapezoidal shape in section and is thicker than the depthwise wall 34. The protruded member 34a is formed with a hole 34b in the vicinity of its center. The depthwise wall 34 extends downwardly of the protruded portion 34a and reaches a depthwise wall edge portion 35 as shown in FIG. 16. A lower edge of the hole 34b in FIG. 16 shifts inwards (downwards in FIG. 16) by a distance □ from the depthwise wall edge portion 35. The following is an elucidation of the reason for this.

It has been known that an inside diameter of the hole 34b is required to be on the order of 1.2–1.6 mm for ensuring a sufficient strength of the spindle member 21h (FIG. 5) supported by the hole 34b. Originally, however, the thickness of the depthwise wall 34 is, e.g., 1.8 mm, which is the same value as the thickness of each of the side walls 32, 33, and hence, if the hole is formed directly in the depthwise wall 34, a wall thickness along the periphery of the hole becomes small enough to raise a possibility of reducing the strength.

Herein, it can be considered that the thickness of the depthwise wall 34 is increased to enable the hole 34b to be formed. If increased, however, this might cause a surface sink (a defect of contraction) in the depthwise wall 34 when in a resin molding process, resulting in a decline in terms of a quality of the external configuration. Such being the case, the depthwise wall 34 is provided with a much thicker protruded member 34a, and the hole 34b is formed in this protruded member 34a. It is a general understanding that the wall thickness is required to be 0.6–1.0 mm in order to ensure the sufficient strength along the periphery of the hole 34b. Hence, it follows that the thickness of the protruded member 34a is on the order of 2.4–3.6 mm.

On the other hand, the storage case for the cartridge might be stocked in an erected state, and it is therefore desirable that the external surface of the depthwise wall 34 be uniformly flat. Accordingly, the protruded member 34a is so structured as to protrude inwardly of the storage case. If the protruded member 34a having such a structure includes the hole 34b formed in such a position as to ensure the sufficient strength, it follows that the lower edge of the hole 34b in FIG. 16 shifts inwards (downwards in FIG. 16) by the distance □ from the depthwise wall edge portion 35.

Further, the portion vicinal to the protruded member 34a shown in FIG. 17 is to be formed by use of a slide core type mold. In such a case, there can be considered a mode in which the whole protruded member 34a is constructed by using a slide core, and a mode in which only the configuration of the hole 34b is formed by using a pin-shaped slide core coincident therewith. Herein, according to the mode of constructing the whole protruded member 34a by use of the slide core, the thickness of the depthwise wall edge portion 35 must be larger, which might raise the problem given above. By contrast, according to the mode in which the only the configuration of the hole 34b is formed by using the pin-shaped slide core, the depthwise wall edge portion 35 can be thinned, and besides a simple operation might suffice for removing the pin, whereby a reliability and a durability of the mold can be enhanced.

Figure 19:
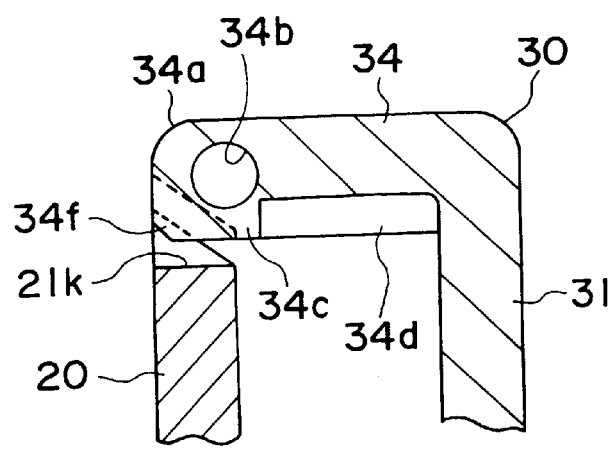
FIG. 19 is a view showing the construction in section taken along the line XIX—XIX in FIG. 18 as viewed in an arrow direction.
Figure 21:
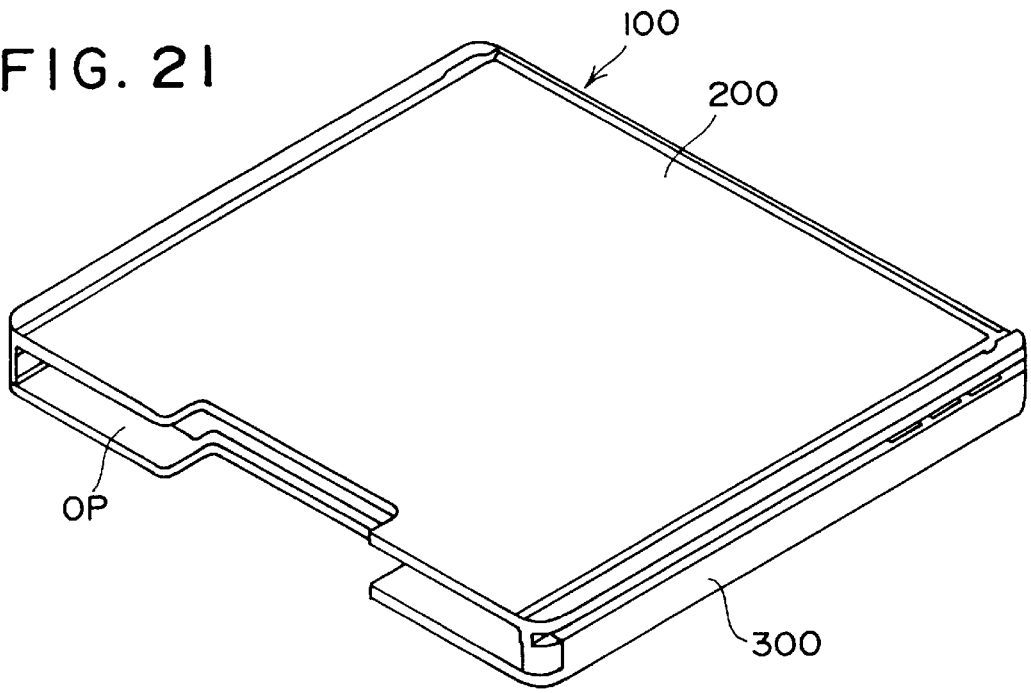
FIG. 21 is a view showing the storage case capable of storing the mini disk in a state where the cover member is closed in a third embodiment.

Incidentally, as explained above, the protruded member 34a takes the shape protruding inwards from the depthwise wall 34, and hence, if the hole 34b receives a large force from the spindle member 21h (FIG. 5), there might be a possibility of a stress of the depthwise wall 34 becomes excessive. This being the case, as shown in FIGS. 19 and 21, a rib 34d is structured along the depthwise wall 34, extending from the protruded member 34a to the bottom wall 31. Since the thus structured rib 34d is provided, it is feasible to restrain the excessive stress from being generated in the depthwise wall 34 even when the large force is exerted upon the hole 34b. If it is presumed that a so large force is not exerted upon the hole 34b, however, the above rib may be removed.

In the case of assembling the cover member 20 to the main body 30, the spindle member 21h (21i) is fitted into the hole 34b so as to expand the swellings 21e, 21f (FIG. 5). In this case, notched portions 21k (of which only one is shown) notched in a trapezoidal shape are formed, as illustrated in FIG. 14, in the vicinity of the proximal part of the support portion (21e), in the upper wall 21 of the cover member 20 in order to relieve a stress at the proximal part of the swelling 21f (21e). An interval between the pair of notched portions 21k is set equal to or larger than the width of the cartridge, thereby making it feasible to prevent inconveniences such as being damaged by an interference with the notched portion 21k when the cartridge is inserted into the storage case.

Further, as is obvious in FIG. 17, the protruded member 34a is formed with a chamfered portion 34e serving as a guide surface at an upper portion of the edge surface formed with the hole 34b. On the other hand, the spindle member 21h corresponding thereto is also formed with a chamfered portion 21m serving as a guide surface at the lower portion of the tip thereof. The chamfered portions 34e, 21m slide on each other, and the cover member 20 is thus assembled to the main body 30, thereby facilitating the assembling operation. The effect in the guiding operation can be exhibited when assembled on condition that any one of the chamfered portions 34e, 21m is provided.

Figure 18:
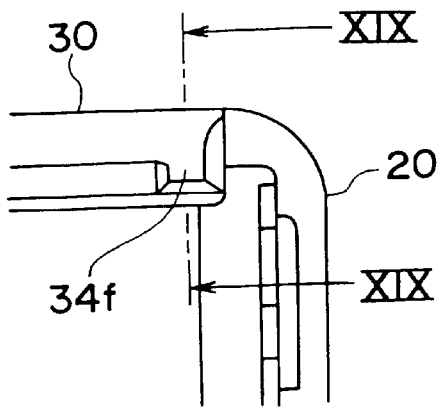
FIG. 18 is a view, corresponding to FIG. 14, showing a modified example of the second embodiment.
Figure 20:
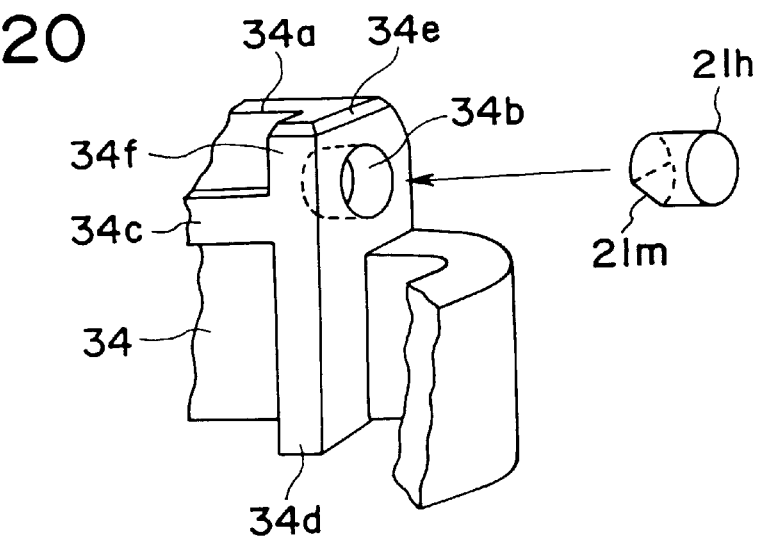
FIG. 20 is a view, corresponding to FIG. 17, showing a modified example of the second embodiment.

FIGS. 18 to 20 are views showing a modified example of the second embodiment. FIG. 18 is a view corresponding to FIG. 14, showing the second embodiment. FIG. 19 is a view in section taken along the line XIX—XIX, showing the construction in FIG. 18, as viewed in an arrow direction. FIG. 20 is a view corresponding to FIG. 17.

Figure 23:
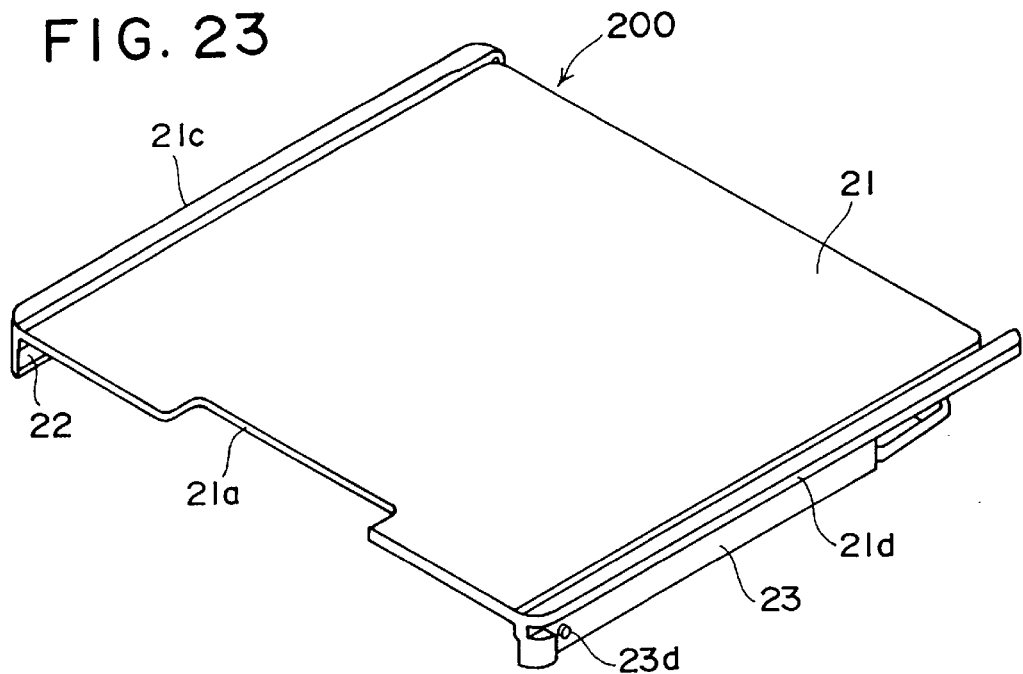
FIG. 23 is a perspective view showing the cover member in FIG. 21.

In the modified example of the second embodiment, as is obvious from FIGS. 18 to 20, a protruded portion 34f serving as a closing portion is constructed by increasing a wall thickness on the left lower side in FIG. 23 along the periphery of the hole 34b. In accordance with this modified example, when the cover member 20 is rotationally moved to the closing position with respect to the main body 30, the protruded portion 34f enters into the notched portion 21k (FIG. 19), and it follows that there is provided a structure in which foreign matters are hard to permeate via the notched portion 21k from outside.

In the second embodiment, the index card ID or ID' in FIG. 10 or 11 can be disposed within the main body 30, and the same effect as that in the first embodiment can be obtained.

The present invention have been discussed so far by way of the embodiments but should not be construed as being limited to the embodiments discussed above. The present invention can be, as a matter of course, properly modified and improved. For example, the pair of spindle members are provided on the main body, and the holes corresponding thereto may be formed in the cover member. Moreover, the main body may be provided with the spindle members and the holes as well, and holes and spindle members corresponding thereto may also be provided in the cover member.

In the storage case for the cartridge in the second embodiment, the connecting unit is constructed of the spindle member provided on one of the main body and the cover member, and of the hole formed in the other of the main body and the cover member and engaged with the spindle member. This construction, though simple, enables the cover member to rotate between the opening position and the closing position with respect to the main body. Moreover, when the cover member totes to the closing position, the opening, which permits the cartridge to be taken in and out from outside, is formed between the main body and the cover member, thereby facilitating the take-in/out of the cartridge. On the other hand, when the sheet-like member such as, e.g., the index card can be taken in and out regardless of whether or not the cartridge is encased in the storage case for the cartridge. Therefore, for instance, even when the index card is disposed between the cartridge and the main body, the index card can be fetched without pulling out the cartridge.

<Third Embodiment>

A third embodiment of the present invention will be described with reference to the drawings.

Figure 22:
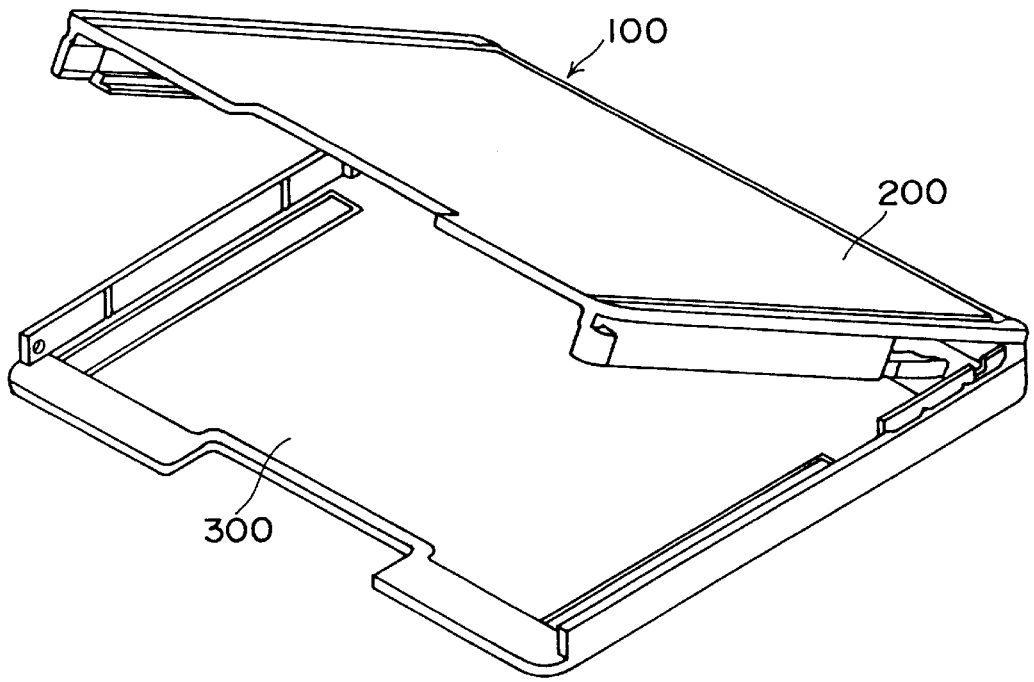
FIG. 22 is a view showing the storage case capable of storing the mini disk in a state where the cover member is opened in the third embodiment.

FIGS. 21 and 22 are perspective views each showing the storage case capable of storing the mini disk in a third embodiment. A thin box-like storage case 100 is constructed of a cover member 200 and a main body 300 as a separate member from the cover member 200. As shown in FIG. 21, the storage case 100 includes the opening OP formed in its front surface, through which the mini disk M (FIGS. 12 and 13) can be taken in and out even in the state where the cover member 200 is closed. In the storage case 100 in the third embodiment, the extrusion opening 21b formed in the storage case in the first embodiment is omitted. The same components of the cover member 200 and of the main body 300 as those of the cover member 20 and the main body 30 in the first embodiment, are marked with the like symbols.

Figure 24:
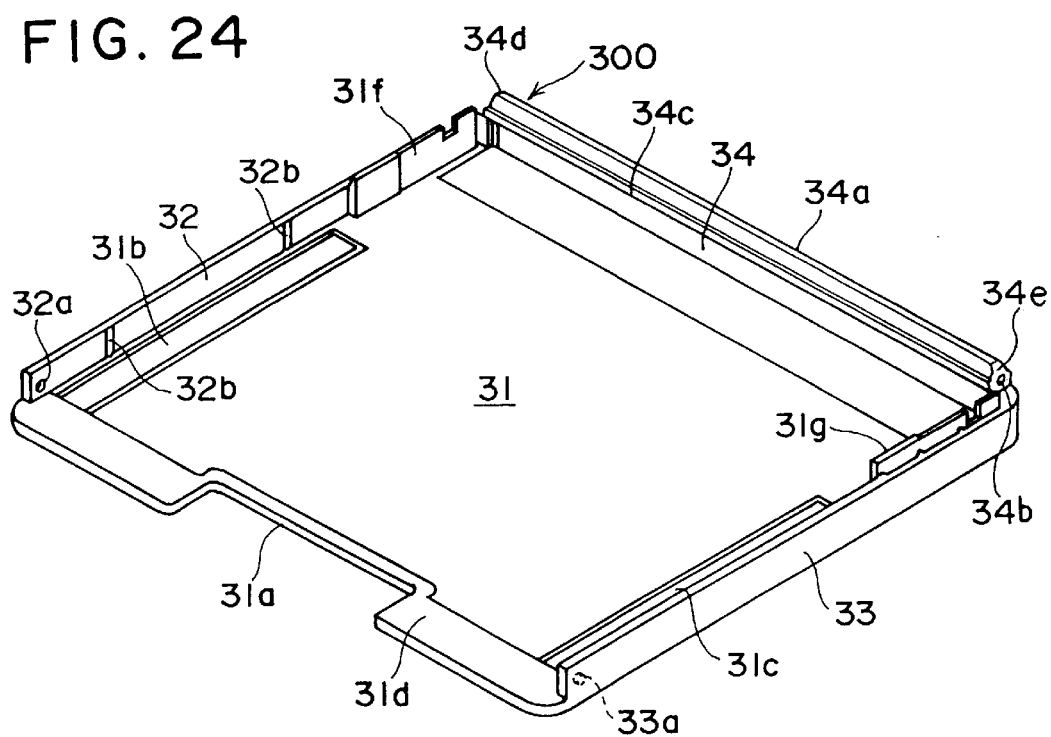
FIG. 24 is a perspective view showing the main body in FIG. 21.
Figure 25:
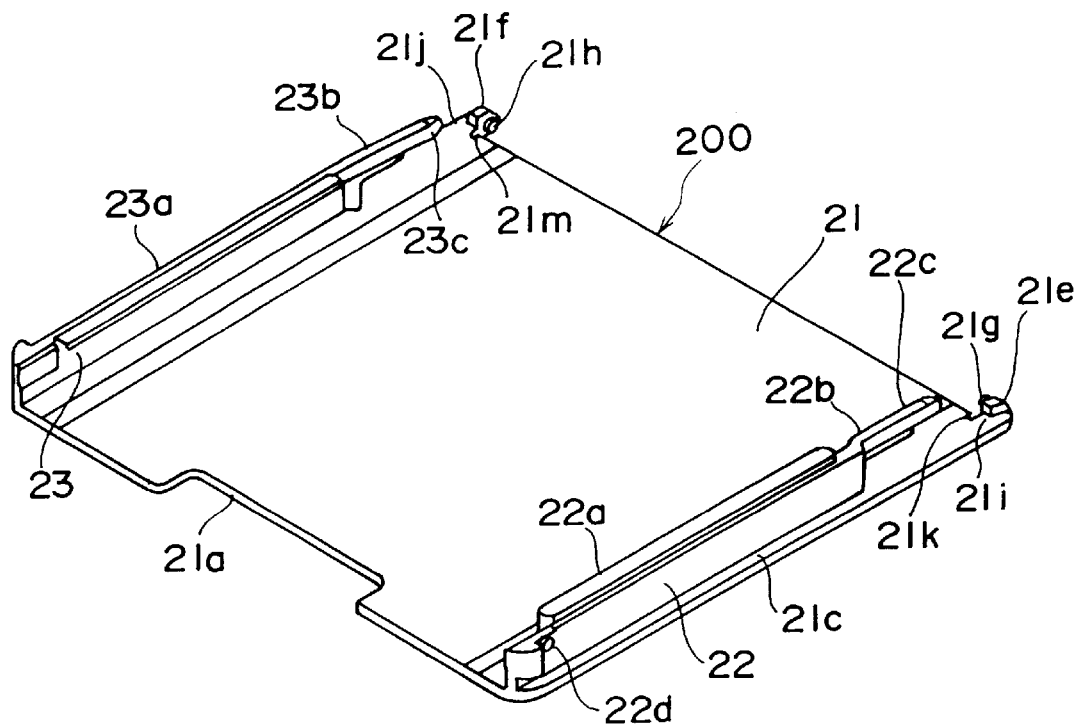
FIG. 25 is a perspective view showing the underside of the cover member in FIG. 23 when reversed.

FIG. 23 is a perspective view showing only the cover member 200. FIG. 25 is a perspective view showing the underside of the cover member 200 when reversed. Referring to FIG. 24, to begin with, the main body 300 is explained. The main body 300 is integrally constructed of the rectangular bottom wall 31, the left side wall 32 connected to one side of the bottom wall 31, the right side wall 33 connected to one side facing to the above one side, and the depthwise wall 34 connected to one side of the bottom wall 31 and orthogonal to the two side walls 32, 33. The bottom wall 31 is formed with the rectangular notched portion 31a along one side facing to the one side to which the depthwise wall 34 is connected (which is hereinafter referred to as the opening-formed side). Further, the bottom wall 31 is formed with the shallow elongate recessed portions 31b, 31c respectively in the vicinities of the left side wall 32 and of the right side wall 33. In addition, the bottom wall 31 is formed, in the vicinity of the depthwise wall 34, with the plate members 31f, 31g extending in parallel to the side walls 32, 33. Further, a rib member 32b is provided on an inner surface side of the left side wall 32 so as to protrude in up-and-down directions in the Figure. Moreover, the same rib member (of which an illustration is omitted) is provided on an inner surface side of the right side wall 33. The cover member is, when opened and closed, brought into contact with the main body 30 at these rib members, thereby ensuring the opening and closing of the cover member 20 and preventing a backlash of the cover member 20 when the cover member 20 is closed. The stepped portion 31d is formed slightly higher in close proximity to the opening-formed side of the bottom wall 31.

The side walls 32, 33 have holes 32a, 33a formed at end portions close to the opening-formed side. The rod-like support member 34a is provided extending over the entire width thereof along the upper edge of the depthwise wall 34, of which both ends are formed with the holes 34b (one hole is illustrated). Notched portions 34d, 34e chamfered in a tapered shape are formed at both ends of the support member 34a. The support member 34a includes the engagement portion 34c overhanging toward the opening-formed side from the depthwise wall 34.

Referring next to FIGS. 23 and 25, the cover member 20 is described. The cover member 200 comprises the rectangular upper wall 21 and the two side walls 22, 23 connected to the upper wall 21. The upper wall 21 is formed with the rectangular notched portion 21a along the side (the opening-formed side) facing to the opening-formed side of the main body 300 (FIG. 24).

The side walls 22, 23 are connected to the vicinities of the two face-to-face sides of the upper wall 21, and therefore the upper wall 21 includes the overhangs 21c, 21d extending outwardly of the side walls 22, 23. The knot-like support members 21e, 21f are provided at edges, opposite to the opening-formed side, of the overhangs 21c, 21d serving as stepped portions. Further, the support members 21e, 21f are formed with the spindle members 21g, 21h facing to each other and each taking a short cylindrical shape. The lower surface-side portions at the tips of the spindle members 21g, 21h are slightly tapered. The support members 21e, 21f are connected to the upper wall 21 through proximal end portions 21i, 21j which are formed with recesses 21k, 21m.

The side walls 22, 23 have elongate holding members 22a, 23a formed facing to each other at the lower edges (the upper edges in FIG. 25) thereof. Further, cantilever arms 22b, 23b are connected to the end portions, opposite to the opening-formed side, of the side walls 22, 23. The tips of the arms 22b, 23b are provided with swellings 22c, 23c each taking a protruded shape. Further, the side walls 22, 23 are provided with the protruded portions 22d (FIG. 25) and 23d (FIG. 23) protruding in such a direction as to separate away from each other in the vicinities of the end portions proximal to the opening-formed side.

Figure 26:
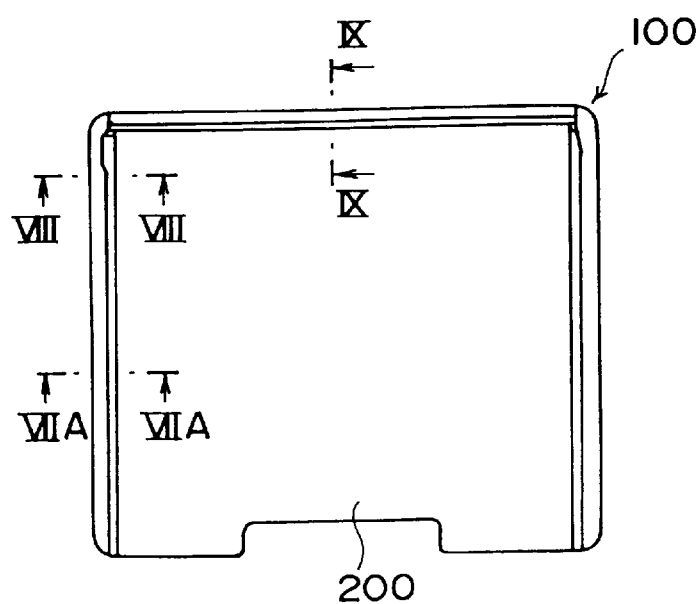
FIG. 26 is a top view showing the storage case in FIG. 22 in the state where the cover member is closed.
Figure 27A:
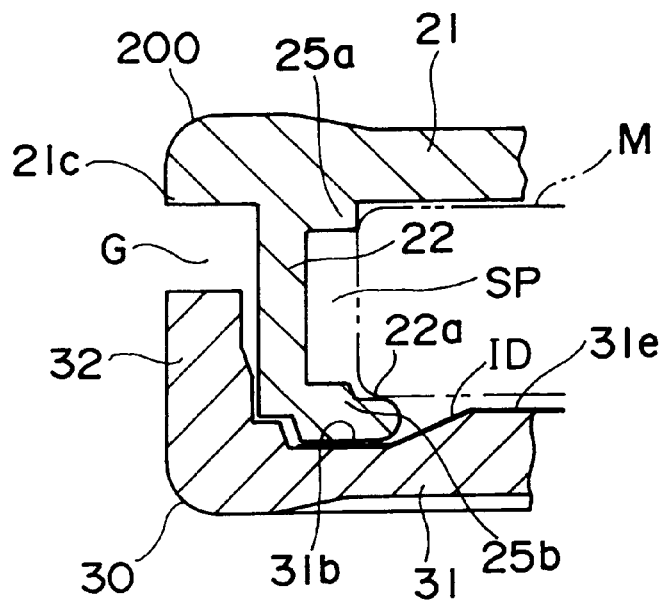
FIG. 27A is a view showing the storage case in section taken along the line VIIA—VIIA in FIG. 26 as viewed in an arrow direction.
Figure 27B:
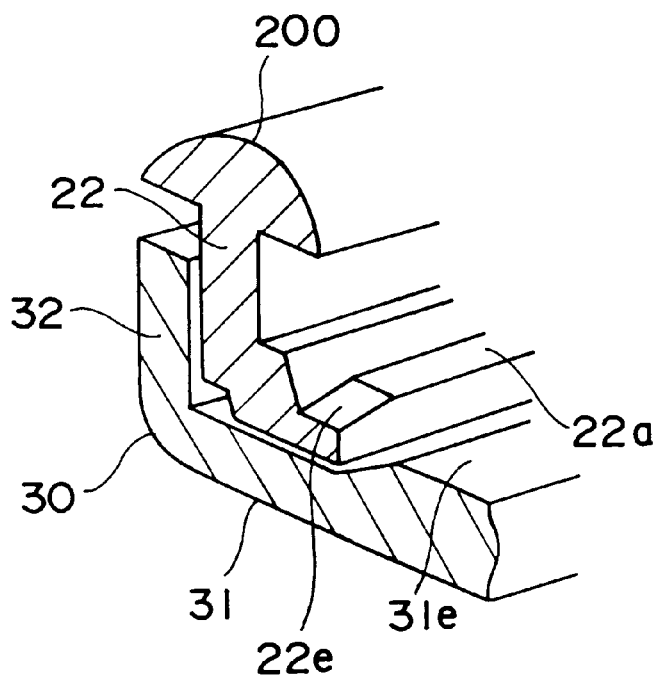
FIG. 27B is a perspective view schematically showing the holding member in the vicinity of the front end of the storage case.
Figure 28:
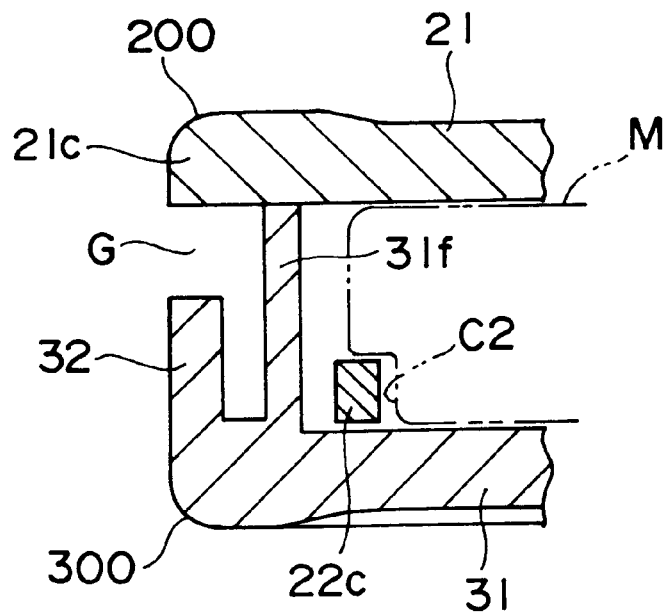
FIG. 28 is a view showing the storage case in section taken along the line VIII—VIII in FIG. 26 as viewed in an arrow direction.
Figure 29:
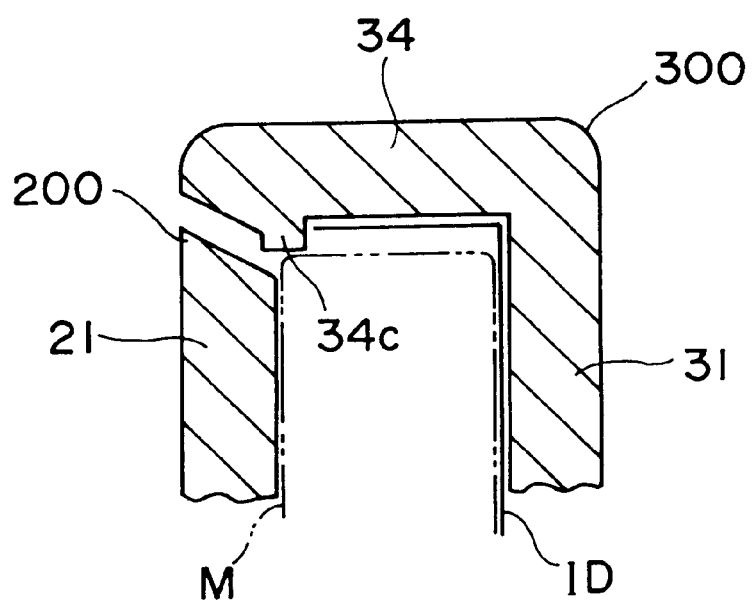
FIG. 29 is a view showing the storage case in section taken along the line IX—IX in FIG. 26 as viewed in an arrow direction.

FIG. 26 is a top view showing the storage case 100 in a state where the cover member 200 is closed. FIG. 27A is a view of the storage case 100 in section taken along the line VIIA—VIIA in FIG. 26 as viewed in an arrow direction. FIG. 28 is a view of the storage case 100 in section taken along the line VIII—VIII in FIG. 26 as viewed in an arrow direction. FIG. 29 is a view of the storage case 100 in section taken along the line IX—IX in FIG. 26 as viewed in an arrow direction. FIG. 27B is a perspective view schematically showing the holding member in the vicinity of the front end of the storage case. FIGS. 27A, 27B and 28 show only the components peripheral to the side wall 32 of the main body 30, however, the construction on the side of the side wall 33 is also the same.

As illustrated in FIG. 27A, in the state where the cover member 20 is closed, the holding member 22a formed on the side wall 22 comes into contact with the recessed portion 31b of the main body 30. Further, the mini disk M inserted into the storage case as indicated by two-dotted line is held between the holding member 22a and the upper wall 21. The upper surface of the elongate plate-like holding member 22a (23a) constitutes the cartridge holding member for holding the cartridge, while the lower surface of the holding member 22a (23a) constitutes the holding member for holding a sheet-like member (the index card shown in FIGS. 10 and 11). Further, as shown in FIG. 27A, the upper surface of the holding member 22a (23a) is is more protruded than the inner surface 31e of the bottom wall 31 of the main body 300. Furthermore, inwardly of each of the side walls 22 and 23, a first protruded portion 25a is provided at a lower corner in the Figure, and a second protruded portion 25b is also provided at an upper corner in the Figure. The first and second protruded portions 25a, 25b serve to position the mini disk M in lateral directions in the Figure within the storage case, and define a spacing SP between the side surface of the mini disk M and the inner surface of each of the side walls 22, 23.

Furthermore, as shown in FIG. 28, when the mini disk M is inserted into the storage case, the swelling 22c defined as the protruded portion enters into the cavity C2 thereof. In section shown in FIG. 28, the plate member 31f impinges upon the cover member 20, thus making tight closing therebetween. The reason therefor is that the cover member 20 is provided with the swelling 22c, and hence the mold, if the cover member 20 is formed with the plate member 31f, becomes complicated enough to increase the costs. Incidentally, the groove G assuming the rectangular shape in section is, though obvious from FIGS. 27A and 28, formed between the overhang 21c of the cover member 20 and the main body 30.

As shown in FIG. 29, when the mini disk M is inserted into the storage case, the inward edge thereof impinges upon the engagement portion 34c of the main body 30 and is thus unable to advance more inwards. Further, as shown in FIG. 27B, for facilitating the insertion of the mini disk M, a front edge of the holding member 22a (23a) has an oblique surface 22e of which a front edge height is lower than the inner surface 31e of the main body 30, and a cartridge introducing portion is thus structured.

As shown in FIG. 21, when assembling the main body 30 and the cover member 20, the spindle members 21g, 21h of the cover member 20 are fitted into the holes 34b (FIG. 24) at the two ends of the support member 34a of the main body 300 while elastically deforming the proximal end portions 21i, 21j (FIG. 25). With the operation thus done, the cover member 20 becomes rotatable about the spindle members 21g, 21h with respect to the main body 300. On the occasion of this assembly, the tapered front edges of the spindle members 21g, 21h cooperate with the notched portions 34d, 34e at the two ends of the support member 34a, thereby making it easier to assemble the cover member 20 to the main body 300.

Given next is an explanation of an operation in the third embodiment when the index card is encased in the storage case 100. To start with, as shown in FIG. 22, the cover member 200 is turned up to the position in which to open the cover member 200 with respect to the main body 300. Subsequently, the index card ID shown in FIG. 10 is inserted thereinto so that the back cover sheet IDa faces to the side wall 34 (FIG. 4) of the main body 300. When the cover member 200 is turned down to the closing position illustrated in FIG. 1 from the state described above, the encasing of the index card is completed. In the state where the cover member 200 is closed, the protruded portions 22d (FIG. 25) and 23d (FIG. 23) of the cover member 200 remain engaged with the holes 32a, 33a of the main body 300, and therefore it never happens that the cover member 200 rotates by accident with respect to the main body 300. While on the other hand, when trying to take out the index card, the operation reversal to the procedure explained so far may be performed. The protruded portions 22d, 23d and the holes 32a, 33a constitute lock members for preventing the main body 300 from further rotating when the cover member 200 rotates and is thus closed.

The operation described above can be carried out irrespective of whether or not the mini disk M is encased in the storage case 100. This is because the mini disk M rotates together with the cover member 200, which does not interfere with the take-in/out of the index card. It is to be noted that the main body 300 and the cover member 200 are composed of the transparent resin, and hence the user is able to read characters written on the back cover sheet IDa and the entry portion IDb of the index card ID from outside of the storage case 100.

In accordance with the third embodiment, the index card ID is disposed within the main body 300, and then the cover member 200 is closed, whereby the index card ID is, as shown in FIG. 27A, fixed with its side edge pressed in the recessed portion 31b of the main body 300 by the holding member 22a of the cover member 200. Accordingly, even when the mini disk M is not stored in the storage case 100, the index card ID is firmly fixed and never falls by accident off the storage case 100 via the opening OP (FIG. 21). It should be noted that when pressed in the recessed portion 31b by the holding member 22a, the index card ID is never, though the side edge thereof might be slightly bent, torn up because of the recessed portion 31b being shallow.

If it is considered undesirable that the index card is bent to the slightest degree, the index card ID' shown in FIG. 11 may be useful. The index card ID' illustrated in FIG. 11 is similar to what is shown in FIG. 10 but has the difference that the rectangular notches IDc are formed at two side edges of the entry portion IDb. The notch IDc takes substantially the same configuration as the recessed portion 31b of the main body 300, and therefore the holding member 22a of the cover member 200 is fitted into the notch IDc by disposing the index card ID' in the main body 300 and closing the cover member 200. Accordingly, even when the cover member 200 is closed, the index card ID' is never bent, and the notch IDc is caught on the holding member 22a, whereby the index card never falls by accident off the storage case 100 via the opening OP even when the mini disk M is not stored in the storage case 100. In this case, as shown in FIG. 27A, the upper surface of the holding member 22a is is more protruded than the inner surface 31e of the main body 300, and consequently the notched portion IDc of the index card ID' becomes easier to be caught on the holding member 22a to ensure the holding of the index card ID', which is a preferable aspect.

Next, there will be explained an operation in the third embodiment when the mini disk M is encased in the storage case 100. As in the sleeve type according to the prior art, the mini disk M can be taken in and out of the storage case 100 in the state where the cover member 20 is closed in accordance with the third embodiment. When the mini disk M is inserted into the storage case, as shown in FIG. 27B, the front edge portion of the holding member 22a (23a) is formed with the oblique surface 22e, and hence the mini disk M is smoothly inserted into the storage case and besides lower than the inner surface 31e of the main body 300, which therefore gives no sense of being caught and makes it easier to be dealt with as well as being preferable. Further, as discussed above, when the mini disk M is inserted into the storage case 100, the inward edge thereof impinges upon the engagement portion 34c (FIG. 29) of the main body 300 and is thus unable to advance more inwards. When trying to make the mini disk M enter till the inward edge thereof impinges upon the side wall 34, there might be a possibility in which the cover member 200 can not be opened in such a state, and the storage case, if forcibly opened, might be damaged.

Figure 34A:
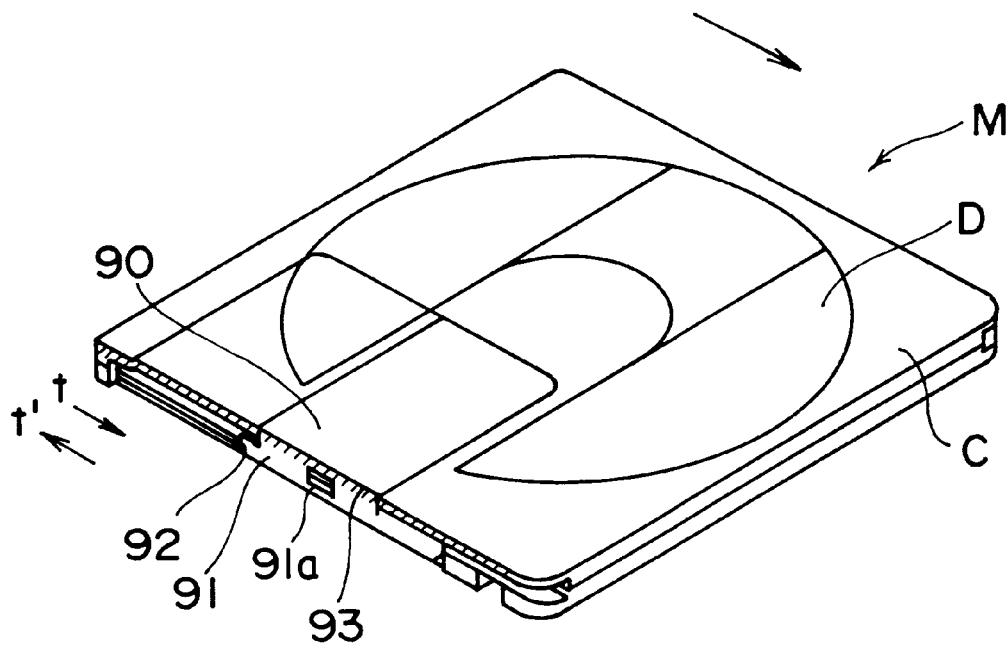
FIG. 34A is a perspective view showing one example of the mini disk M.
Figure 34B:
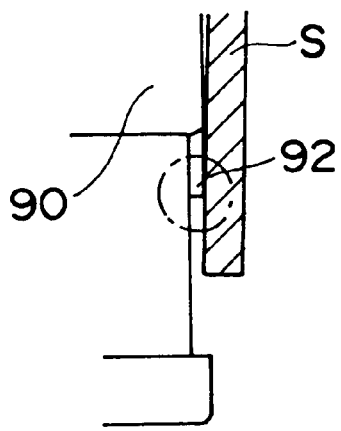
FIGS. 34B and 34C are partial plan views for explaining a problem inherent in the prior art storage case.
Figure 34C:
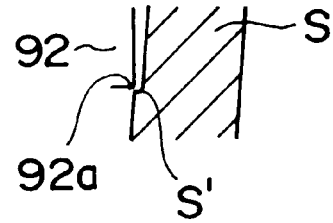

Further, when the mini disk M is inserted into the storage case, an upper edge corner (indicted by the oblique lines in FIG. 34A of the side surface of the mini disk M is brought into contact with the first protruded portion 25a formed inwardly of the side wall 22 in FIG. 27A, and the two protruded portions 25a, 25 define the spacing SP between the side surface of the mini disk M and the inner surface of each of the side walls 22, 23. Therefore, even when the mini disk M is inserted with a skew as shown in FIG. 34B, it never happens that an edge portion 92 of a shutter member 90 of the mini disk M impinges upon the side wall of the cover member 20 to such an extent that this side wall is dented to form a recessed portion. The second protruded portion 25b cooperates with the first protruded portion 25a to guide the mini disk M and increase the strength of the side wall.

Moreover, when the mini disk M is inserted into the storage case 100, while the cover member 200 remains closed, the stepped portion 31d formed on the opening side of the main body 300 is higher by a thickness of the card than the bottom wall 31 on which the index card ID is disposed so that the index card ID previously disposed inside does not hinder the storage case 100 from advancing. Further, the upper surface of the holding member 22a (23a) is more protruded than the inner surface 31e of the main body 300, and the index card ID is disposed in a spacing formed therebetween. With this arrangement, the mini disk M, when taken in and out, does not rub against the index card ID, whereby the mini disk M can be easily taken in and out and can thus be well dealt with.

In the case of taking the mini disk M out of the storage case 100 with the cover member 20 closed, the user may draw out the mini disk M by holding the mini disk M exposed from the central notches 21a, 31a.

The mini disk M can be inserted along the lower surface of the cover member 200 in the state of the cover member 200 being opened. In such a case, the inward edge of the mini disk M impinges upon the engagement portion 34c (FIG. 29), and the cavities C1, C2 thereof engage with the swellings 22c, 23c of the cover member 200, with the result that the mini disk M is held by the cover member 200.

Furthermore, in the third embodiment, in the state of the cover member 200 being closed, the groove G (i.e., a gap) is, as shown in FIGS. 27A and 28, formed between the main body 300 and the cover member 200. Accordingly, with the use of this groove G, the storage case in the third embodiment can be housed in a container for housing a plurality of storage cases as disclosed in, e.g., Japanese Patent Application Laid-Open No.8-295385.

Figure 30:
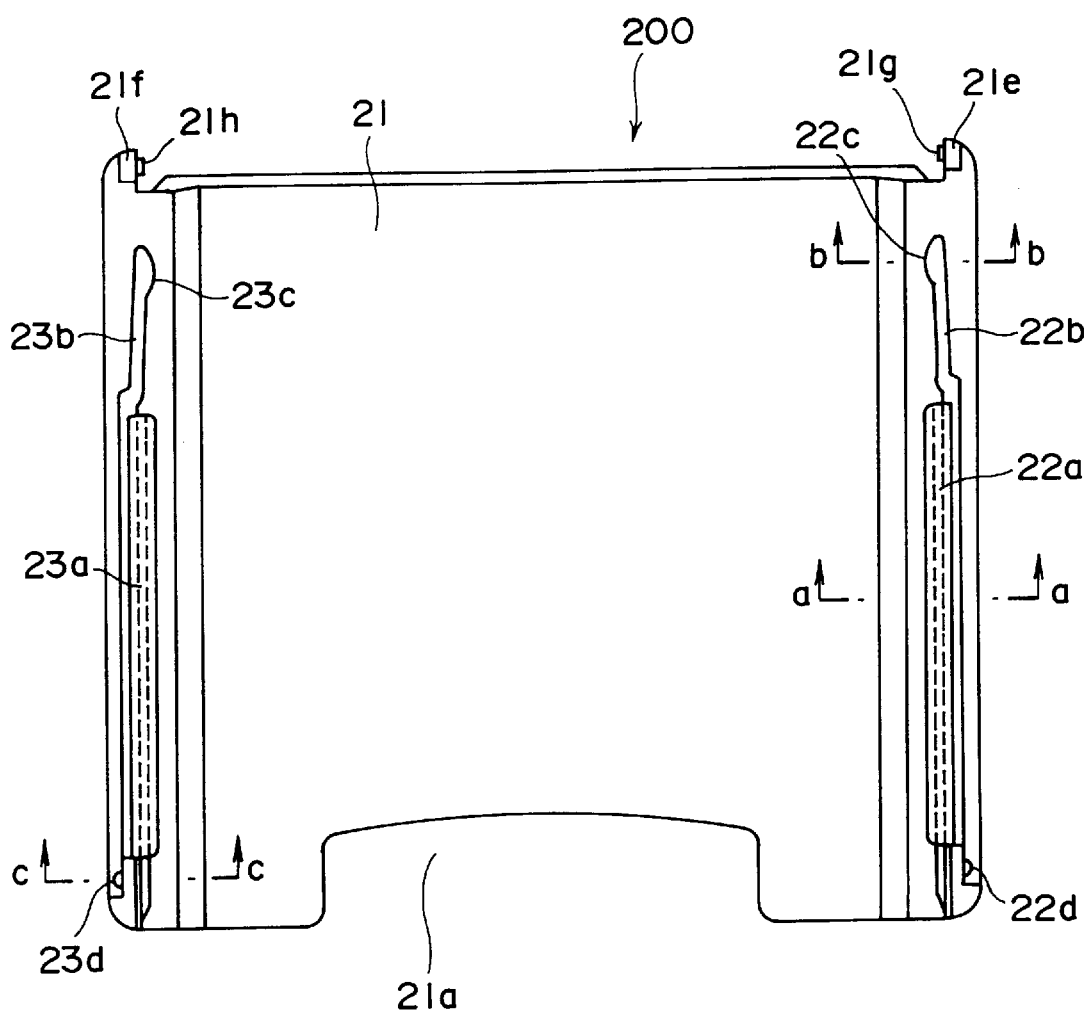
FIG. 30 is a plan view showing the cover member in FIGS. 23 and 25 as viewed from an inner surface thereof.
Figure 32:
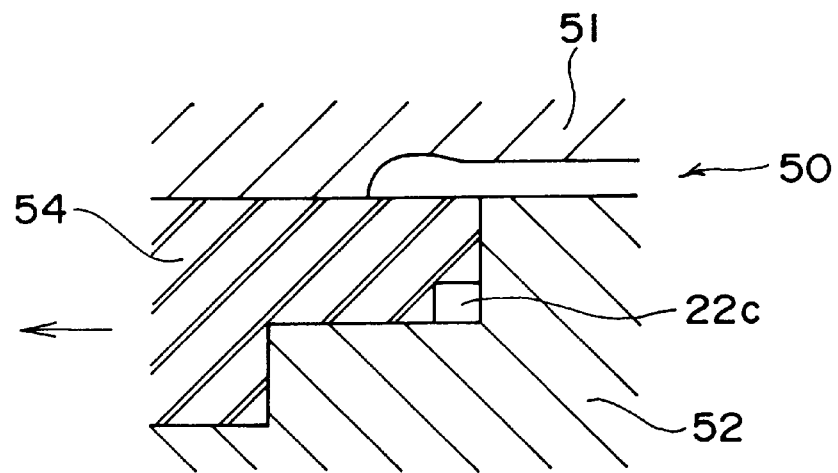
FIG. 32 is a sectional view of the mold taken along the line b—b in FIG. 30, which corresponds to a swelling (a protruded portion) of an arm of the cover member.
Figure 33:
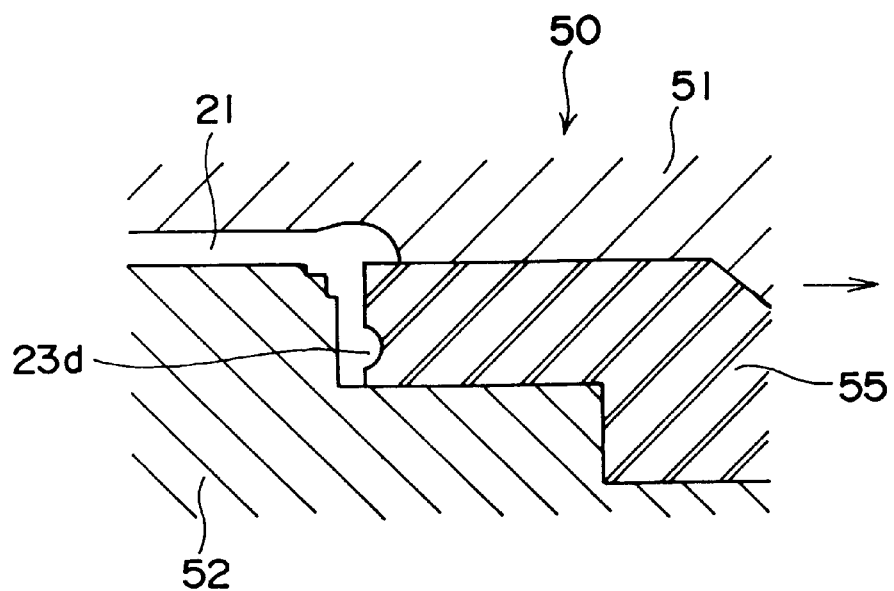
FIG. 33 is a sectional view of the mold taken along the line c—c in FIG. 30, which corresponds to a protruded portion of the cover member.

Next, a forming mold for forming the cover member 200 described above will be explained with reference to FIGS. 30–33. FIG. 30 is a plan view of the cover member as viewed from the inner surface. FIG. 31A is a sectional view of the mold corresponding to the holding member of the cover member in section taken along the line a—a in FIG. 30. FIG. 31B is a sectional view of the mold in FIG. 31A, showing how the mold is moved in a mold releasing process. FIG. 32 is a sectional view of the mold corresponding to the swelling (the protruded portion) of the arm of the cover member in section taken along the line b—b in FIG. 30. FIG. 33 is a sectional view of the mold corresponding to the protruded portion of the cover member in section taken along the line c—c in FIG. 30.

As illustrated in FIG. 30, the protruded portions 22d, 23d provided on the side walls 22, 23, the holding members 22a, 23a and the arms 22b, 23b including the swellings (the protruded portions) 22c, 23c of the cover member 200, are disposed in position different from each other without being overlapped on the plane.

The forming mold 50 for the cover member 200 involves, for forming the holding member of the cover member 200, as shown in IG. 31A, the use of a fixed mold 51, a movable mold 52 and an inclined slide 53 disposed on the side of the movable mold 52. A cavity CA (of which respective parts are hereinafter in the same manner marked with the numerals given for the cover member 200) formed in the mold 50 takes a configuration corresponding to the holding member of the cover member. Further, as shown in FIG. 32, a slide core 54 is used for forming the arm 22b, an another slide core 55 is, as illustrated in FIG. 33, employed for forming the protruded portion 23d.

Upon opening the mold after being formed, as shown in FIG. 31B, the inclined slide 53 advances in an arrow direction in the Figure, and it comes to a state where the cover member 200 defined as a molded product can be taken out. At the same time, as shown in FIG. 32, the slide core 54 slides in an arrow direction in FIG. 32, and as illustrated in FIG. 33 the slide core 55 slides in an arrow direction in FIG. 33. Thus, the molded product (the cover member 200) can be taken out. In this instance, the advancing direction of the inclined slide 53 is different from the slide direction of each of the slide cores 54, 55.

The protruded portions 22d, 23d, the holding members 22a, 23a, the swellings (protruded portions) 22c, 23c, which are provided on the side walls 22, 23 of the cover member 20, all contain undercuts in terms of a structure of the mold. Therefore, in the case of structuring the mold for forming the cover member 20 including these components, it is required that the slide core and the inclined slide be used. If the protruded portions 22d, 23d, the holding members 22a, 23a and the swellings (the protruded portions) 22c, 23c are close to each other, there must be adopted such a structure that the slide core and the inclined slide are disposed within the same plane. When disposed in this way, the guide portion of the inclined slide becomes close to the slide core, and the strength of the movable mold declines, whereby there arises a problem of shortening a life-span of the mold. By contrast, in accordance with the third embodiment, as shown in FIG. 30, the protruded portions 22d, 23d, the holding members 22a, 23a and the swellings (the protruded portions) 22c, 23c, are disposed apart so as not to be overlapped with each other, and it is therefore feasible to structure the mold by using the slide core and the inclined slide. An enhancement of the strength thereof is thus attained, and the life-span of the mold is also made longer. This makes it possible to increase the productivity of the cover member.

In accordance with the third embodiment, it is feasible to provide the storage case for the cartridge, which is excellent of a handling property when taking in and out the index card while firmly holding it and inserting and pulling out the cartridge. It is also possible to provide the storage case for the cartridge with no problem in which the inside portion of the storage case is dented by he impingement of the shutter member of the cartridge upon the inner surface of the storage case. Further, according to the method of manufacturing the storage case in the third embodiment, it is feasible to attain the enhancement of the strength of the mold, extend the life-time of the mold, and improve the productivity of the storage case.

<Fourth Embodiment>

The storage case in a fourth embodiment of the present invention is capable of storing the mini disk and is constructed substantially the same as the storage case in the third embodiment. The storage case in the fourth embodiment has, however, a difference that a rib member higher than the thickness of the mini disk is provided in the vicinity of the edge portion of the cover member on the side of the rotary spindle. The respective components of a cover member 20' and a main body 30' are marked with the same numerals as those of the cover member 200 and the main body 300 in the third embodiment.

Figure 35:
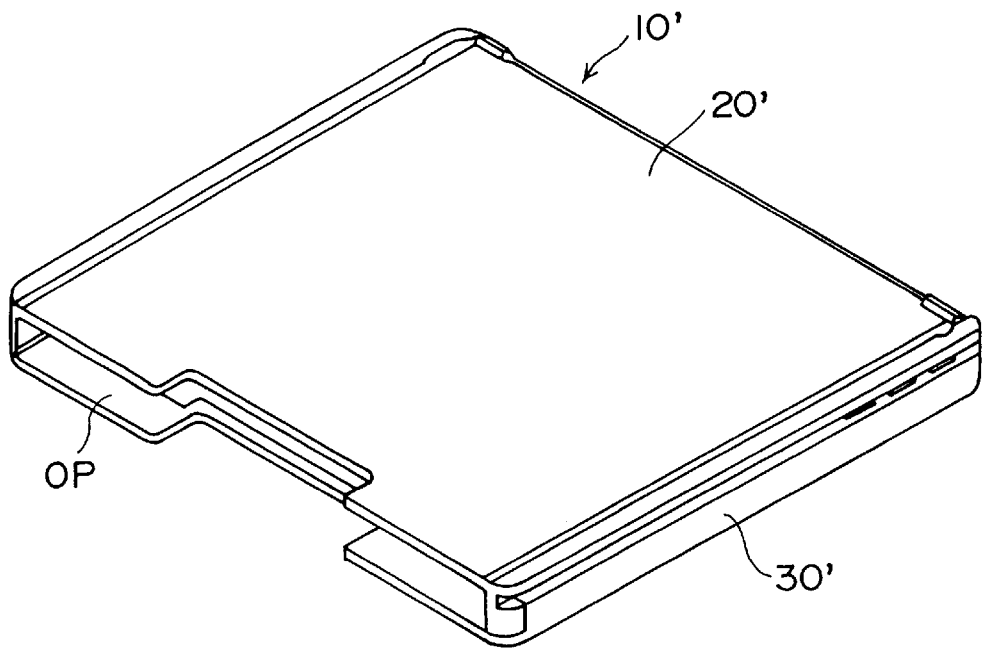
FIG. 35 is a perspective view showing a storage case capable of storing a mini disk in a fourth embodiment, and showing the state where the cover member is closed.
Figure 36:
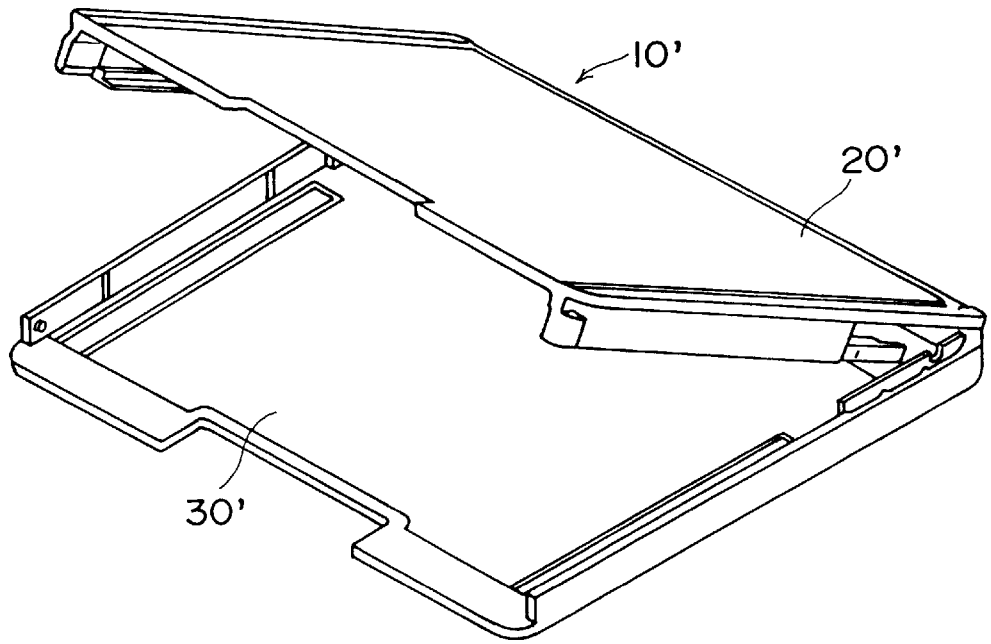
FIG. 36 is a perspective view showing the storage case capable of storing the mini disk in the fourth embodiment, and showing the state where the cover member is opened.

Referring to FIGS. 35 and 36, a thin box-like storage case 10' is constructed of a cover member 20' and a main body 30' as a separate member from the cover member 20'. As shown in FIG. 1, the storage case 10' includes the opening OP formed in its front surface, through which the mini disk M (FIGS. 12 and 13) can be taken in and out even in the state where the cover member 20' is closed.

Figure 37A:
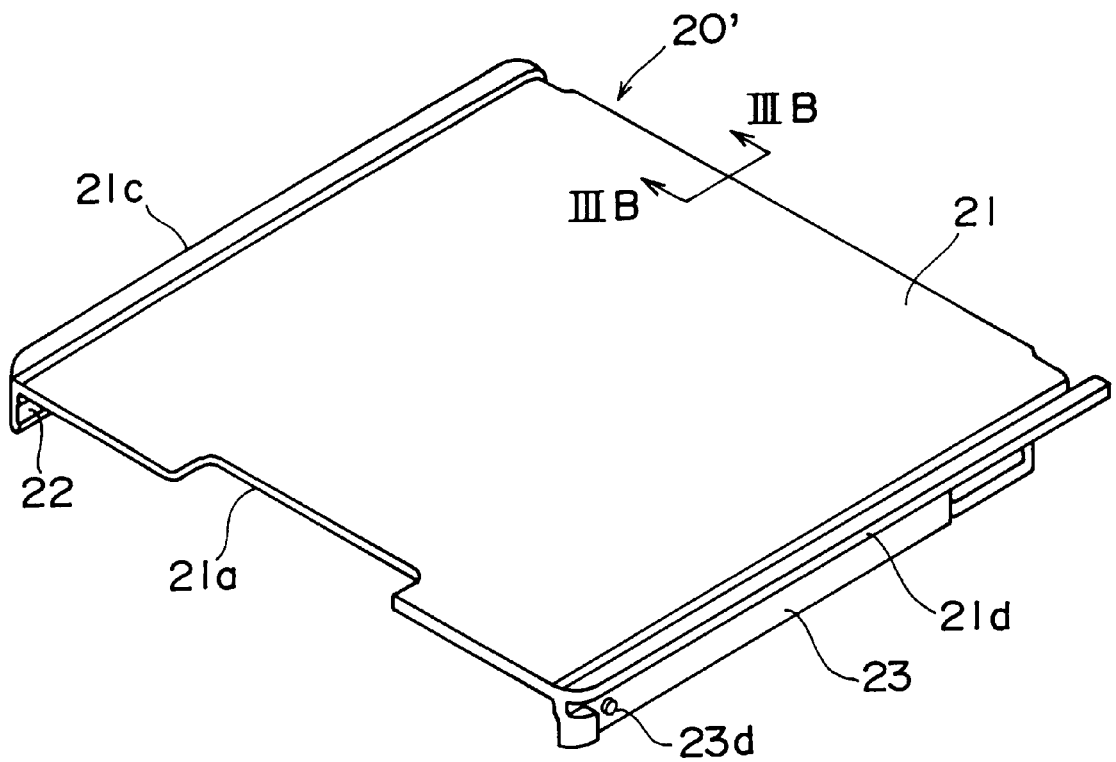
FIG. 37A is a perspective view showing the cover member in FIG. 36.
Figure 37B:
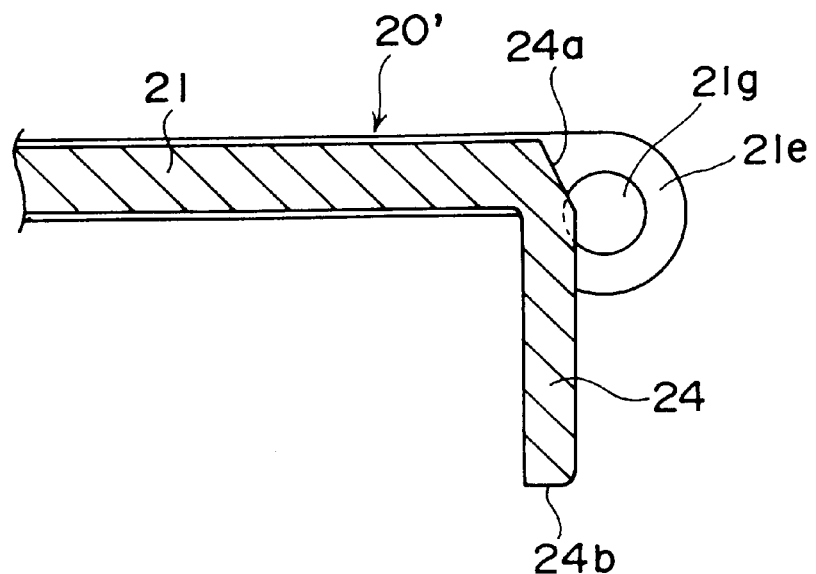
FIG. 37B is a sectional view of the cover member taken along the line IIB—IIB in FIG. 37A as viewed in an arrow direction.
Figure 38A:
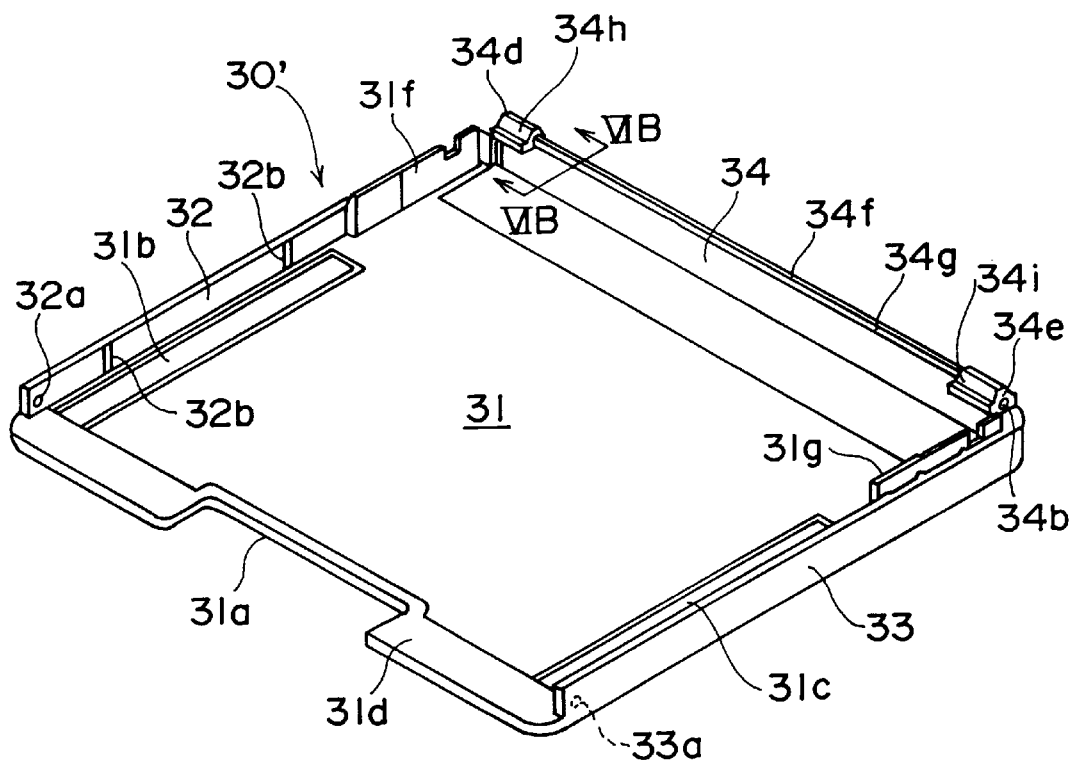
FIG. 38A is a perspective view showing the main body in FIG. 36.
Figure 38B:
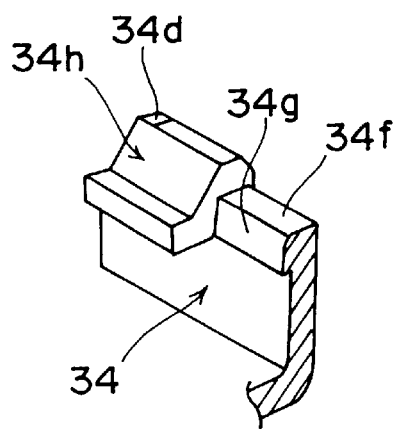
FIG. 38B is a perspective view of the main body in section taken along the line IVB—IVB in FIG. 38A.
Figure 39:
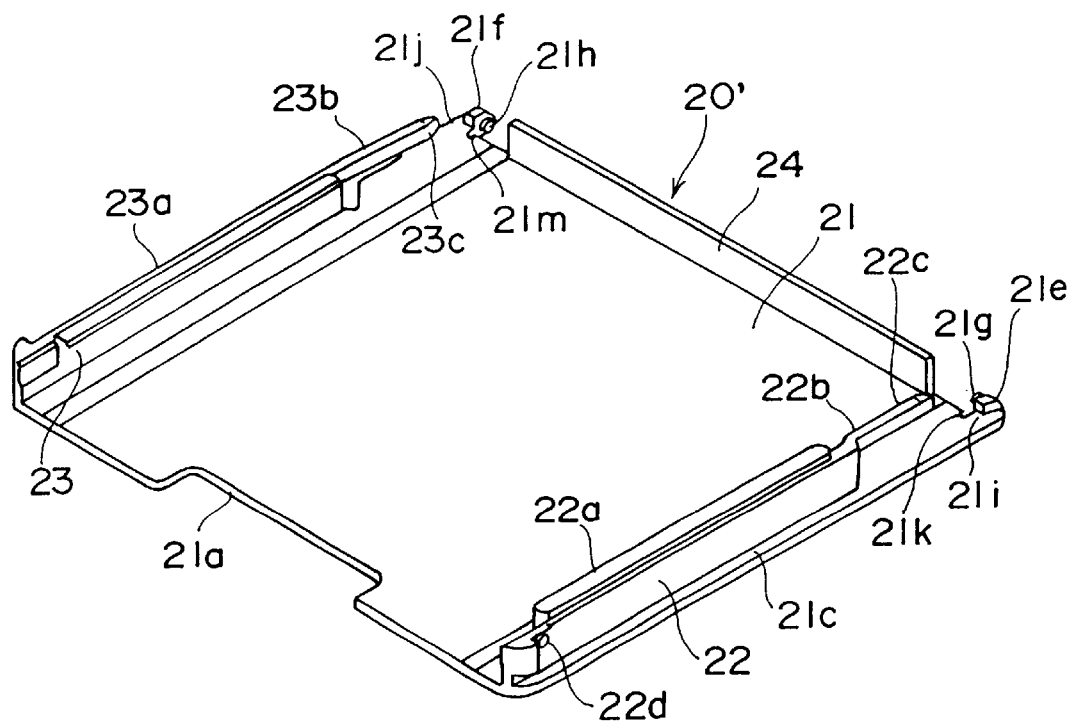
FIG. 39 is a perspective view showing an underside of the cover member in FIG. 37A when reversed.

FIG. 37A is a perspective view showing only the cover member 20'. FIG. 37B is a sectional view of the cover member 20' in section taken along the line IIIB—IIIB in FIG. 37A as viewed in an arrow direction. FIG. 38B is a perspective view of the cover member 20' in section taken along the line VIB—VIB in FIG. 38A. FIG. 39 is a perspective view showing the underside of the cover member 20' when reversed. Referring to FIG. 38A, to begin with, the main body 30' is explained. The main body 30' is integrally constructed of the rectangular bottom wall 31, the left side wall 32 connected to one side of the bottom wall 31, the right side wall 33 connected to one side facing to the above one side, and the depthwise wall 34 (the side wall on the side of the rotary spindle) connected to one side of the bottom wall 31 and orthogonal to the two side walls 32, 33. The bottom wall 31 is formed with the rectangular notched portion 31a along one side facing to the one side to which the depthwise wall 34 is connected (which is hereinafter referred to as the opening-formed side). Further, the bottom wall 31 is formed with the shallow elongate recessed portions 31b, 31c respectively in the vicinities of the left side wall 32 and of the right side wall 33. In addition, the bottom wall 31 is formed, in the vicinity of the depthwise wall 34, with the plate members 31f, 31g extending in parallel to the side walls 32, 33. Further, the rib member 32b is provided on an inner surface side of the left side wall 32 so as to protrude in up-and-down directions in the Figure. Moreover, the same rib member (of which the illustration is omitted) is provided on an inner surface side of the right side wall 33. The cover member is, when opened and closed, brought into contact with the main body 30' at these rib members, thereby ensuring the opening and closing of the cover member 20' and preventing a backlash of the cover member 20' when the cover member 20' is closed. The stepped portion 31d is formed slightly higher in close proximity to the opening-formed side of the bottom wall 31.

As shown in FIGS. 38A, 38B, the side walls 32, 33 have the holes 32a, 33a formed at end portions close to the opening-formed side. Spindle support members 34h, 34I are so provided as to protrude at two ends of the upper edge of the depthwise wall 34. The upper edge between these spindle support members 34h, 34I is notched to form a notched upper surface 34f and a notched side surface 34g. The holes 34b (one hole is illustrated) are formed in an external edge surfaces of the spindle support members 34h, 34I, and notched portions 34d, 34e chamfered in the tapered shape are formed in the upper edges thereof. The notched side surface 34g overhangs toward the opening-formed side from the notched side surface 34g.

Referring next to FIGS. 37A, 37B and 39, the cover member 20' is described. The cover member 20' comprises the rectangular upper wall 21 and the two side walls 22, 23 connected to the upper wall 21. The upper wall 21 is formed with the rectangular notched portion 21a along the side (the opening-formed side) facing to the opening-formed side of the main body 30' (FIG. 38A). further, a rib member 24 is erected at the end, opposite to the opening-formed side, of the upper wall 21.

The side walls 22, 23 are connected to the vicinities of the two face-to-face sides of the upper wall 21, and therefore the upper wall 21 includes the overhangs 21c, 21d extending outwardly of the side walls 22, 23. The knot-like support members 21e, 21f are provided at edges, opposite to the opening-formed side, of the overhangs 21c, 21d serving as stepped portions. Further, the support members 21e, 21f are formed with the spindle members 21g, 21h facing to each other and each taking a short cylindrical shape, these spindle members serving as rotary spindles between the main body and the cover member. The lower surface-side portions at the tips of the spindle members 21g, 21h are tapered. The support members 21e, 21f are connected to the upper wall 21 through the proximal end portions 21i, 21j which are formed with the recesses 21k, 21m.

Furthermore, the rib member 24 is provided at a part of the end portion opposite to the opening-formed side, and paces are formed between the support members 21e, 21f and the two edge surfaces of the rib member 24 so that the spindle support members 34h, 34i of the main body 30' are positioned respectively therein. As shown in FIG. 37B, a rib chamfered portion 24a is formed on the edge surface, on the side of the proximal end portion, of the rib member 24.

The side walls 22, 23 have elongate holding members 22a, 23a formed facing to each other at the lower edges (the upper edges in FIG. 39) thereof. Further, cantilever arms 22b, 23b serving as a biasing members are connected to the end portions, opposite to the opening-formed side, of the side walls 22, 23. The tips of the arms 22b, 23b are provided with the swellings 22c, 23c each taking a protruded shape. Further, the sidewalls 22, 23 are provided with the protruded portions 22d (FIG. 39) and 23d (FIG. 37A) protruding in such a direction as to separate away from each other in the vicinities of the end portions proximal to the opening-formed side.

Figure 40:
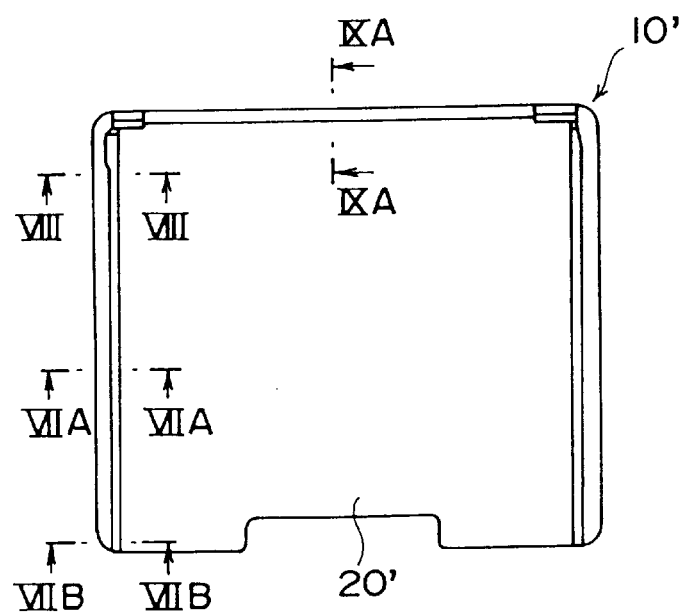
FIG. 40 is a top view showing the storage in the state where the cover member is closed.
Figure 41A:
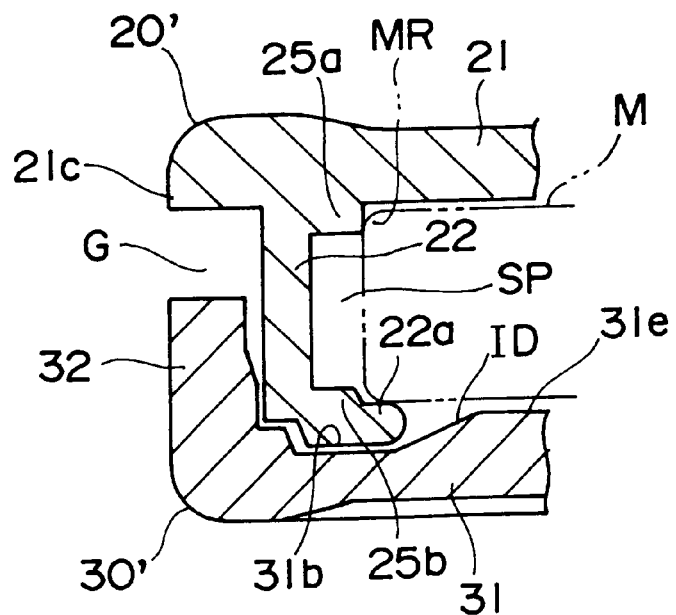
FIG. 41A is a sectional view showing the storage case taken along the line VIIA—VIIA in FIG. 40 as viewed in an arrow direction.
Figure 41B:
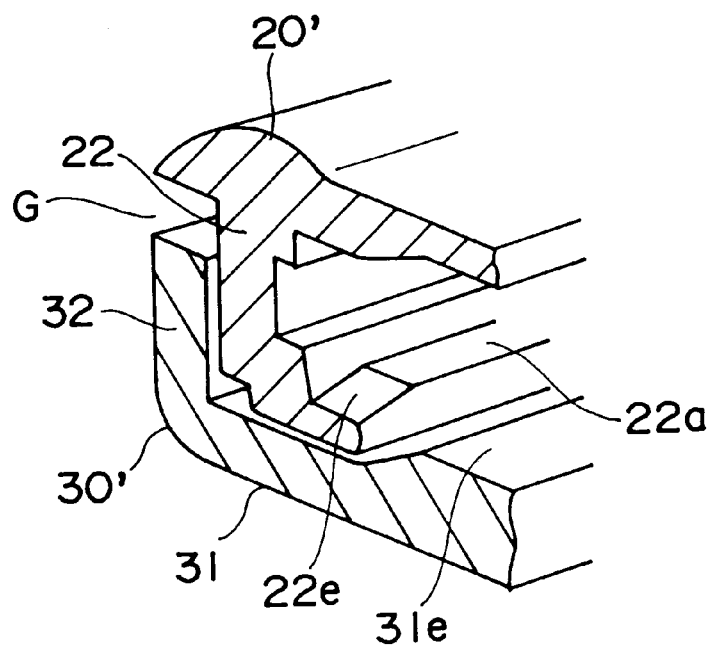
FIG. 41B is a schematic perspective of the holding member, showing the vicinity of a front edge of the storage case in section taken along the line VIIB—VIIB in FIG. 40.
Figure 42:
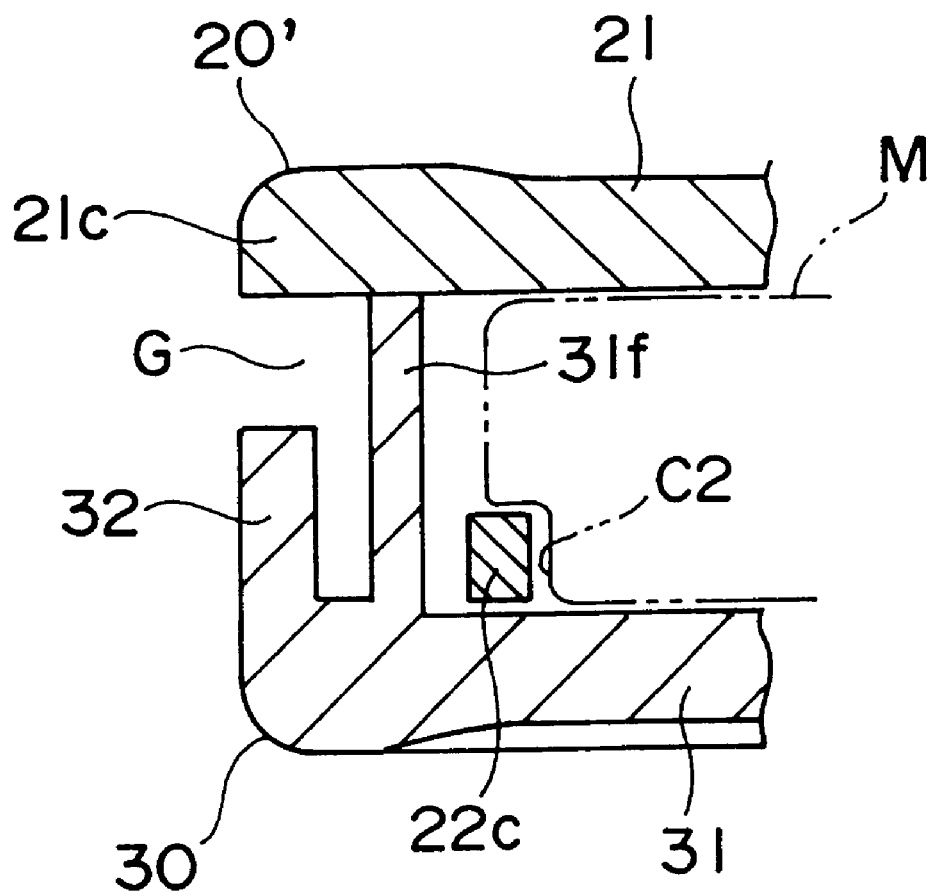
FIG. 42 is a sectional view showing the storage case taken along the line VIII—VIII in FIG. 40 as viewed in an arrow direction.
Figure 43A:
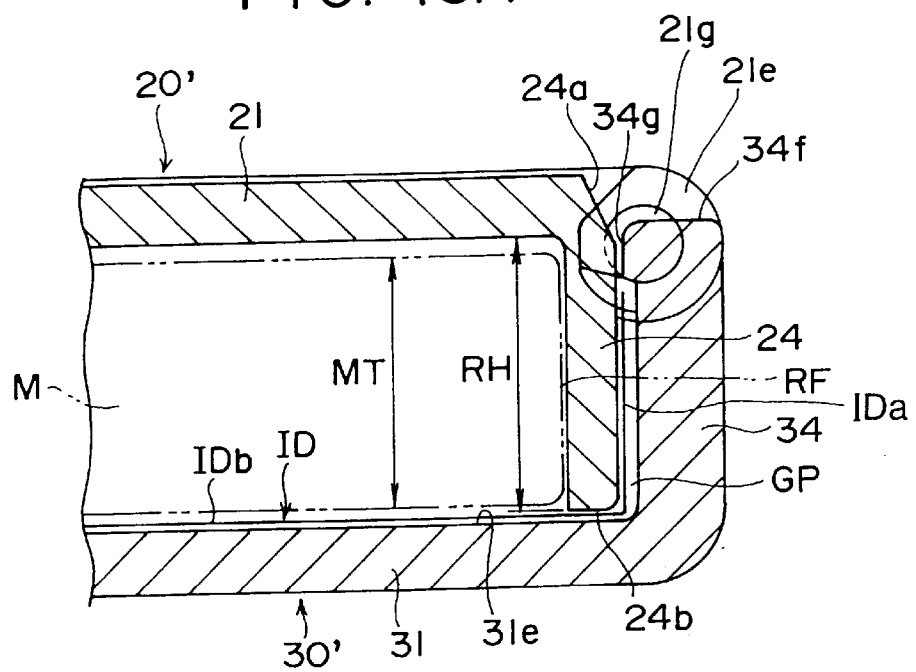
FIG. 43A is a sectional view showing the storage case taken along the line IX—IX in FIG. 40 as viewed in an arrow direction.
Figure 43B:
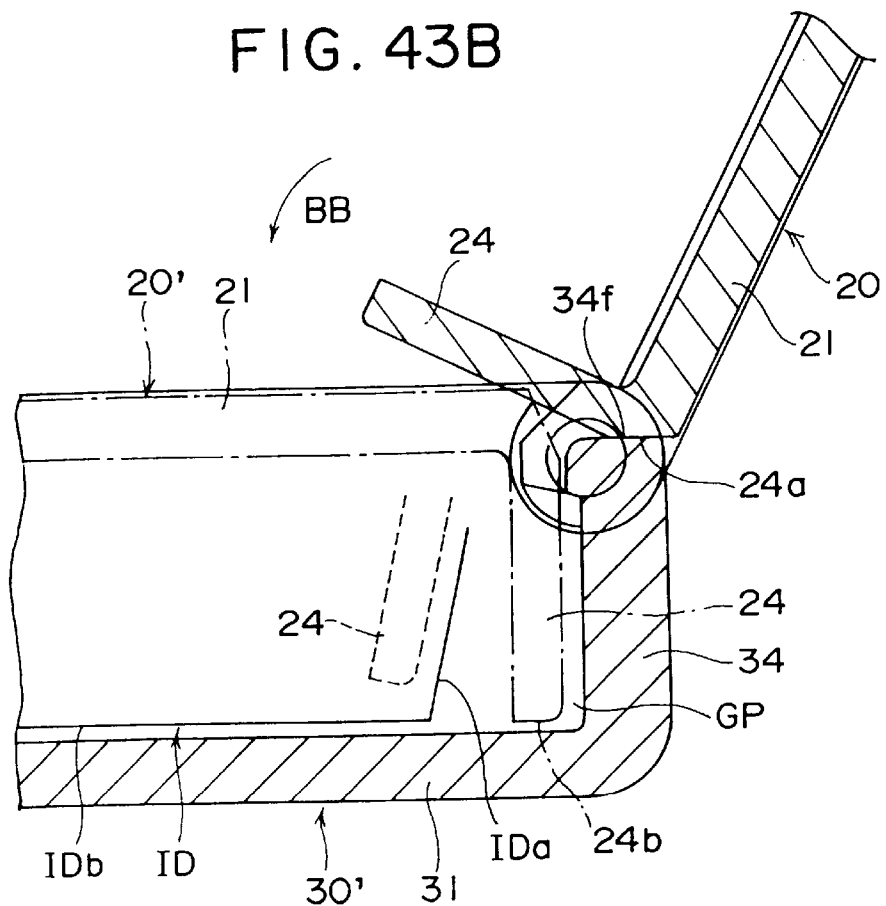
FIG. 43B is a sectional view, similar to FIG. 43A, showing how the cover member rotates from an opened state to a closed state.

FIG. 40 is a top view showing the storage case 10' in a state where the cover member 20' is closed. FIG. 41A is a view of the storage case 10' in section taken along the line VIIA—VIIA as viewed in an arrow direction. FIG. 41B is a perspective view schematically showing the holding member in a state where the vicinity of the front edge of the storage case 10' in FIG. 40 is cut by the line VIIB—VIIB. FIG. 42 is a view of the storage case 10' in section taken along the line VIII—VIII in FIG. 40 as viewed in an arrow direction. FIG. 43A is a sectional view of the storage case 10' in section taken along the line IX—IX in FIG. 40 as viewed in an arrow direction. FIG. 43B is a view similar to FIG. 43A, showing a state where the cover member 20' rotates from the opening state to the closing state. FIGS. 41A, 41B and 42 show only the components peripheral to the side wall 32 of the main body 30', however, the construction on the side of the side wall 33 is also the same.

As illustrated in FIG. 41A, in the state where the cover member 20' is closed, the holding member 22a formed on the side wall 22 comes into contact with the recessed portion 31b of the main body 30'. Further, the mini disk M inserted into the storage case as indicated by two-dotted line is held between the holding member 22a and the upper wall 21. The upper surface of the elongate plate-like holding member 22a (23a) constitutes the cartridge holding member for holding the cartridge, while the lower surface of the holding member 22a (23a) constitutes the holding member for holding the sheet-like member (the index card shown in FIGS. 10 and 11). Further, as shown in FIG. 41A, the upper surface of the holding member 22a (23a) is more protruded than the inner surface 31e of the bottom wall 31 of the main body 30'. Furthermore, inwardly of each of the side walls 22and 23, the first protruded portion 25a is provided at a lower corner in the Figure, and the second protruded portion 25b is also provided at an upper corner in the Figure. The first and second protruded portions 25a, 25b serve to position the mini disk M in lateral directions in the Figure within the storage case, and define the spacing SP between the side surface of the mini disk M and the inner surface of each of the side walls 22, 23.

As shown in FIG. 42, when the mini disk M is inserted into the storage case, the swelling 22c defined as the protruded portion enters into the cavity C2 thereof. In section shown in FIG. 42, the plate member 31f impinges upon the cover member 20', thus making tight closing therebetween. The reason therefor is that the cover member 20' is provided with the swelling 22c, and hence the mold, if the cover member 20' is formed with the holding member 31f, becomes complicated enough to increase the costs. Incidentally, the groove G assuming the rectangular shape in section is, though obvious from FIGS. 7 and 8, formed between the overhang 21c of the cover member 20' and the main body 30'.

Further, as shown in FIG. 43A, the rib member 24 of the cover member 20' has a height RH larger than a thickness MT of the mini disk M, whereby the front edge 24b of the rib member 24 becomes close to the inner surface 31e of the bottom surface 31 of the main body 30'. Further, when the cover member 20' is in the closing position, a lower edge portion of the rib chamfered portion 24a of the rib member 24 approaches the notched side surface 34g of the main body 30'. When rotated in a direction opposite to a direction BB in FIG. 43B, however, the rib chamfered portion 24a impinges upon the notched upper surface 34f and thus stops, thereby regulating an aperture angle of the cover member 20'. Further, a narrow gap GP is formed between the inner surface of the depthwise wall 34 and the rib member 24 in the closing position. As shown in FIG. 43A, when the mini disk M is inserted into the storage case, an inward side surface RF thereof impinges upon the rib member 24, whereby the mini disk M is unable to advance more inwards (rightward in FIG. 43A).

As illustrated in FIG. 41B, for facilitating the insertion of the mini disk M, the front edge of the holding member 22a (23a) has the oblique surface 22e of which a front edge height is lower than the inner surface 31e of the main body 30', and cartridge introducing portion is thus structured.

As shown in FIG. 35, when assembling the main body 30' and the cover member 20', the spindle members 21g, 21h (FIG. 39) of the cover member 20' are fitted into the holes 34b (FIG. 38A) of the spindle support members 34h, 34i of the main body 30' while elastically deforming the proximal end portions 21i, 21j (FIG. 39). With the operation thus done, the cover member 20' becomes rotatable about the spindle members 21g, 21h with respect to the main body 30'. On the occasion of this assembly, the tapered front edges of the spindle members 21g, 21h cooperate with the notched portions 34d, 34e at the upper edges of the spindle support members 34h, 34I, thereby making it easier to assemble the cover member 20' to the main body 30'.

Given next is an explanation of an operation in the fourth embodiment when the index card is encased in the storage case 10'. To start with, as shown in FIG. 36, the cover member 20' is turned up to the position in which to open the cover member 20' with respect to the main body 30'. Subsequently, the index card ID shown in FIG. 10 is inserted thereinto so that the back cover sheet IDa faces to the side wall 34 (FIG. 38A) of the main body 30'. When the cover member 20' is turned down to the closing position illustrated in FIG. 35 from the state described above, the back cover sheet IDa is interposed in the narrow gap GP between the depthwise wall 34 and the rib member 24 as shown in FIG. 43A, and the encasing of the index card ID is thus completed. In the state where the cover member 20' is closed, the protruded portions 22d (FIG. 39) and 23d (FIG. 37A) of the cover member 20' remain engaged with the holes 32a, 33a of the main body 30', and therefore it never happens that the cover member 20' rotates by accident with respect to the main body 30'. While on the other hand, when trying to take out the index card, the operation reversal to the procedure explained so far may be performed. The protruded portions 22d, 23d and the holes 32a, 33a constitute lock members for preventing the main body 30' from further rotating when the cover member 20' rotates and is thus closed.

Further, in the case of storing the index card into the storage case 10', even when the index card is not completely set in the main body 30' as shown in FIG. 43b, the rib member 24 rotates together with the cover member 20' in the rotating direction BB in FIG. 43B and reaches a position indicated by the broken line in the Figure. Thereupon, the back cover sheet IDa of the index card ID is pushed toward the depthwise wall 34 and moved to a position indicated by the one-dotted line in the Figure, whereby the index card ID can be surely stored as shown in FIG. 43A. Thus, the insertion of the index card can be facilitated, and, even when not completely stored therein, the index card can be automatically stored with the rotation of the cover member 20'.

The operation described above can be carried out irrespective of whether or not the mini disk M is encased in the storage case 10'. This is because the mini disk M rotates together with the cover member 20', which does not interfere with the take-in/out of the index card. It is to be noted that the main body 30' and the cover member 20' are composed of the transparent resin, and hence the user is able to read characters written on the back cover sheet IDa and the entry portion IDb of the index card ID from outside of the storage case 10'. In this case, as shown in FIG. 43A, when the cover member 20' is in the closing position, the back cover sheet IDa is positioned in the narrow gap between the rib member 24 and the depthwise wall 34 of the main body and is therefore closely fitted to the inner surface of the depthwise wall 34. Consequently, the display information on the back cover sheet IDa of the index card becomes easier to read, whereby a visual recognizing property of the index card is improved. Besides, the back cover sheet IDa is, even if not bent erectly from the index card ID, automatically closely fitted to the inner surface of the depthwise wall 34, which is convenient for use.

In accordance with the fourth embodiment, the index card ID is disposed within the main body 30', and then the cover member 20' is closed, whereby the index card ID is, as shown in FIG. 41A, fixed with its side edge pressed in the recessed portion 31b of the main body 30' by the holding member 22a of the cover member 20'. Accordingly, even when the mini disk M is not stored in the storage case 10', the index card ID is firmly fixed and never falls by accident off the storage case 10' via the opening OP (FIG. 35). It should be noted that when pressed in the recessed portion 31b by the holding member 22a, the index card ID is never, though the side edge thereof might be slightly bent, torn up because of the recessed portion 31b being shallow. Further, as shown in FIG. 43A, the front edge 24a of the rib ember 24 is brought into contact with the entry portion IDb of the plane area in the vicinity of he depthwise wall 34 of the main body, with the result that the index card is surely fixed. Moreover, the fixation by the rib member 24 and the holding member 22a of the cover member 20' makes it possible to certainly prevent the floating and deviation of the index card.

Further, if it is considered undesirable that the index card is, as described above, bent to the slightest degree by the holding member 22a, the index card ID' shown in FIG. 11 may be useful. The index card ID' illustrated in FIG. 11 is similar to what is shown in FIG. 10 but has the difference that the rectangular notches IDc are formed at two side edges of the entry portion IDb. The notch IDc takes substantially the same configuration as the recessed portion 31b of the main body 30', and therefore the holding member 22a of the cover member 20' is fitted into the notch IDc by disposing the index card ID' in the main body 30' and closing the cover member 20'. Accordingly, even when the cover member 20' is closed, the index card ID' is never bent, and the notch IDc is caught on the holding member 22a, whereby the index card never falls by accident off the storage case 10' via the opening OP even when the mini disk M is not stored in the storage case 10'. In this case, as shown in FIG. 41A, the upper surface of the holding member 22a is more protruded than the inner surface 31e of the main body 30', and consequently the notched portion IDc of the index card ID' becomes easier to be caught on the holding member 22a to ensure the holding of the index card ID', which is a preferable aspect. Further, the index card ID' is easy to float because of having no notched potion IDc but is fixed by the rib member 24 in the vicinity of the depthwise wall 34, thereby enabling the floating described above to be surely prevented.

Next, there will be explained an operation in the fourth embodiment when the mini disk M is encased in the storage case 10'. As in the sleeve type according to the prior art, the mini disk M can be taken in and out of the storage case 10' in the state where the cover member 20' is closed in accordance with the fourth embodiment. When the mini disk M is inserted into the storage case, as shown in FIG. 41B, the front edge portion of the holding member 22*a* (23*a*) is formed with the oblique surface 22*e* serving as the cartridge introducing portion, and hence the mini disk M is smoothly inserted into the storage case. Besides, the introducing-side lower edge of the oblique surface 22*e* is lower than the inner surface 31*e* of the main body 30', which therefore gives no sense of being caught and makes it easier to be dealt with as well as being preferable.

Then, when the mini disk M is further inserted into the storage case 10', the swellings 22*c*, 23*c* of the cover member 20' enter and engage with the cavities C1, C2 of the mini disk M, and the mini disk M can be surely held within the storage case by dint of the elastic force of the arms 22*b*, 23*b* serving as the biasing members. Then, when engaged, the inward edge of the mini disk M becomes close to the rib member 24 as shown in FIG. 43A, and therefore the mini disk M can be held more surely by restraining the backlash of the mini disk M which remains stored.

Moreover, when the mini disk M is inserted into the storage case, an upper edge corner MP of the side surface of the mini disk M impinges upon the first protruded portion 25*a* inside the side wall 22 in FIG. 41A, and the spacing is defined by the two protruded portions 25*a*, 25*b* between the side surface of the mini disk M and the inside surfaces of the side walls 22, 23. Therefore, even when the mini disk M is inserted with a skew in the inserting direction, it never happens that an edge portion of a shutter member 90 of the mini disk M impinges upon the side wall 22 of the cover member 20 with the result that this side wall 22 is dented strong enough to form a recess. The second protruded portion 25*b* cooperates with the first protruded portion 25*a* to guide the mini disk M and strengthen the side wall.

Further, when the mini disk M is inserted into the storage case 10' with the cover member 20' closed, the stepped portion 31*d* formed on the side of the opening of the main body 30' is higher by a card thickness than the bottom wall 31 on which to dispose the index card ID so that the index card ID previously disposed inside does not hinder the entering of the storage case 10'. Furthermore, the upper surface of the holding member 22*a* (23*a*) is more protruded than the inner surface 31*e* of the main body 300, and the index card ID is disposed in a spacing formed therebetween. With this arrangement, the mini disk M, when taken in and out, does not rub against the index card ID, whereby the mini disk M can be easily taken in and out and can thus be well dealt with.

The mini disk M can be inserted along the lower surface of the cover member 20' in the state of the cover member 20' being opened. In such a case, the inward edge of the mini disk M impinges upon the rib member 24, and the cavities C1, C2 thereof engage with the swellings 22*c*, 23*c* of the cover member 20', whereby the mini disk M is held by the cover member 20'.

Figure 44:
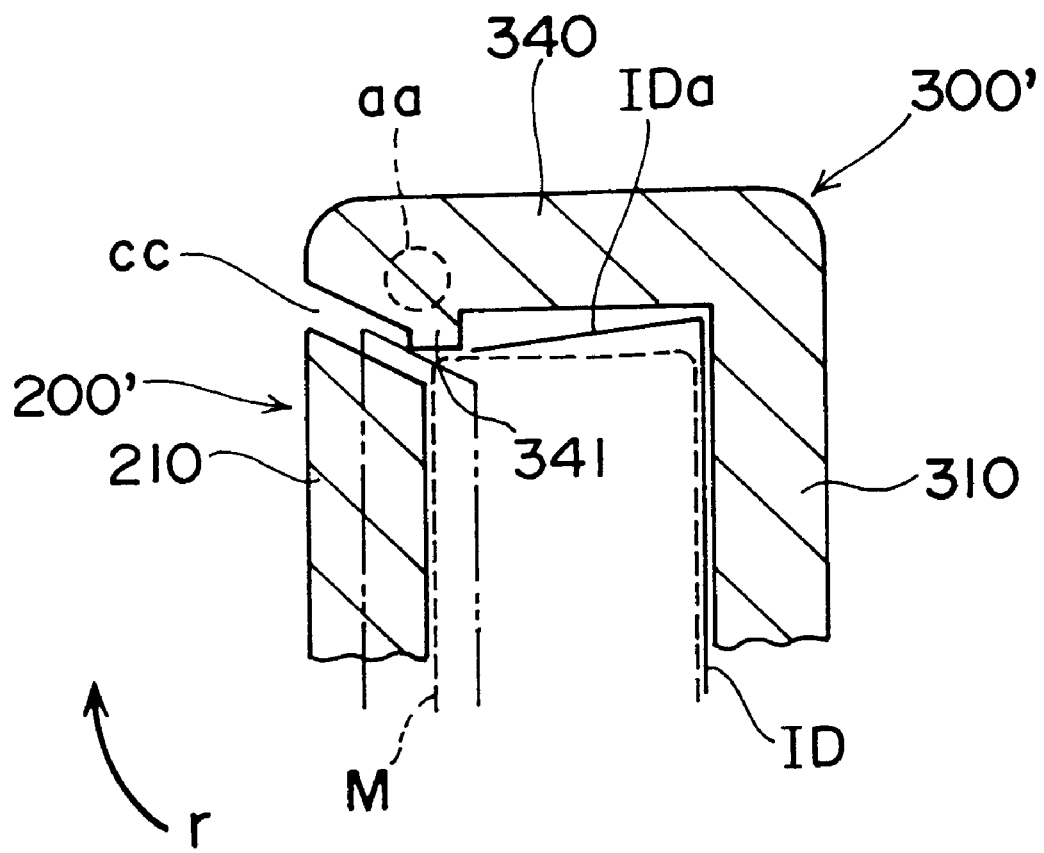
FIG. 44 is an explanatory sectional view of the storage case with no rib member, showing an effect in a fourth embodiment.

Effects of the cartridge storage case described above are explained. As shown in FIG. 44 (showing the example in which the rib member 24 is not provided), the cover member 200' rotates with respect to the main body 300' (which rotates in the direction opposite to a direction r when closed), and it is therefore required that a clearance cc be provided between the edge portion, on the side of a rotary spindle aa, of a depthwise wall 340 of the main body 300' and the edge portion of an upper wall 210 of the cover member 200'. Due to this clearance cc, however, when taking out a cartridge M indicated by the broke line from the storage case or inserting it thereinto, the upper wall 210 of the cover member 200' and a bottom wall 310 of the main body 300' are pressed strong enough to cause flexures of the cover member 200' and the main body 300'. Then, the cover member 200' and the main body 300' are brought into contact with the cartridge, and there might be damaged the cartridge and the storage case as well. Such a problem does not occur on the side of the main body 300' in the case of the index card ID being encased. On the side of the cover member 200', however, for example, the upper wall 210 comes to have a flexure as indicated by the two-dotted line in the Figure and is thus brought into contact with the cartridge M. Further, although the above flexure might shrink as the clearance cc in FIG. 44 is reduced, warping might appears depending on the forming conditions after being formed, or a deformation is caused due to a temperature increased and a load applied depending on the using environment, in which case a trouble might easily occur in the rotation of the cover member 200'.

With respect to the problems described above, the storage case in the four embodiment is structured so that the front edge 24*b* of the rib member 24 formed on the cover member 20' becomes close to the bottom wall 31 of the main body 30' in the state where the cover member 20' is closed. Consequently, the rib member 24 comes into contact with the main body side even by strongly pressing the cover member 20' and the main body 30' when used. Therefore, neither the cover member 20' nor the main body 30' is deformed to the slightest degree and comes into contact with the mini disk, thereby making it feasible to prevent the mini disk and the storage case from being damaged. Further, even if there is enlarged the clearance between the rear end of the upper wall 21 of the cover member and the depthwise wall 34 of the main body, the deformations of the two components can be prevented by the rib member.

In accordance with the fourth embodiment, on the occasion of actualizing the storage case which facilitates the take-out of the index card, ensures the holding thereof and is excellent of the handling property when the cartridge is taken in and out, it is feasible to provide the cartridge storage case capable of preventing the cartridge and the storage case from being damaged even when the force is exerted from outside, and causing no trouble in the rotation of the cover member. It is also possible to provide the cartridge storage case into which to easily insert the index card, of which the visual recognizing property is improved.

The present invention has been discussed by way of the embodiments but may be modified in many forms within the range of the gist of the present invention, and these modifications are not excluded from the scope of the present invention.

What is claimed is:

1. A storage case for a cartridge, comprising:
   a main body;
   a cover member rotatably supported on said main body and rotatable between an opening position and a closing position, said cover member including a protruded portion configured to engage with a recessed portion of said cartridge, a cartridge holding member configured to hold said cartridge while said cover member rotates between said opening and closing positions, and a biasing member configured to provide an elastic force for said protruded portion to engage with the recessed portion;

an opening formed between said main body and said cover member when said cover member rotates to the closing position and for permitting an insertion of said cartridge from outside; and a lock member for preventing, when said cover member rotates to the closing position, the rotation thereof with respect to said main body, wherein said recessed portion engages with said protruded portion when said cartridge is inserted into said storage case, thereby preventing said cartridge from coming off.

2. A storage case for a cartridge according to claim 1, further comprising a sheet-like member detachably disposed between said main body and said cover member, said sheet-like member is held between said main body and an outer portion of said cartridge holding member when said cover member rotates to the closing position.

3. A storage case for a cartridge according to claim 2, wherein:

the sheet-like member has a notch having a shape which complements said outer portion of said cartridge holding member; and when said cover member rotates to the closing position, said notch is caught by said outer portion of said cartridge holding member, thereby preventing the sheet-like member from coming off said cartridge storage case.

4. A storage case for a cartridge according to claim 3, wherein:

said cartridge holding member has a notched portion on an end side adjacent to the opening;

the sheet-like member has an ear-like projection protruding at an end of the notch and having a shape which complements the notched portion of said cartridge holding member; and when said cover member rotates to the closing position, the ear-like projection is interposed between said main body and an edge portion of a side surface of said cover member.

5. A storage case for a cartridge according to claim 1, wherein said cover member and said main body each have a side surface, and when said cover member rotates to the closing position, the side surface of said cover member and the side surface of said main body form a groove.

6. A storage case for a cartridge according to claim 1, wherein said main body includes an engagement portion for regulating the entering of said cartridge with respect to said cover member when said cartridge is inserted into said cartridge storage case.

7. A cartridge stored in said cartridge storage case claimed in claim 1.

8. A storage case for a cartridge according to claim 1, 2, 3 or 5, wherein said main body includes a protrusion at which said main body is brought into contact with said cover member.

9. A storage case for a cartridge according to claim 1, wherein said protruded portion and said cartridge holding member are disposed in different positions of said cover member such that said protruded portion and cartridge holding member are not on the same plane.

10. A storage case for a cartridge according to claim 9, further comprising a rotary member disposed in a position, different from those of the protruded portion and said cartridge holding member, of said cover member, and configured to engage said cover member and said main body such that said cover member rotates with respect to said main body.

11. A storage case for a cartridge according to claim 1, wherein:

said main body includes an inner surface and a recessed portion formed in the inner surface;

when said cover member rotates to the closing position, a lower edge of said cartridge holding member enters into the recessed portion formed in the inner surface of said main body; and an upper edge of said cartridge holding member is more protruded than the inner surface of said main body.

12. A storage case for a cartridge according to claim 11, further comprising a cartridge introducing portion for facilitating an insertion of said cartridge, provided at an edge portion, on a side next to said opening, of said cartridge holding member.

13. A storage case for a cartridge according to claim 12, wherein:

the cartridge introducing portion has at least one of an oblique surface portion and a stepped portion; and a front edge, on the side of said opening, of the oblique surface portion or the stepped portion is lower than the inner surface of said main body when said cover member rotates to the closing position.

14. A storage case for a cartridge according to claim 11, further comprising a protruded portion for positioning said cartridge, provided at a corner of a surface of said cover member, which faces to a side surface of said cartridge when holding said cartridge.

15. A storage case for a cartridge according to claim 11, wherein the protruded portion and said cartridge holding member are disposed in different positions of said cover member such that said protruded portion and cartridge holding member are not on the same plane.

* * * * *